(12) United States Patent
Miyamoto et al.

(10) Patent No.: US 7,198,866 B2
(45) Date of Patent: Apr. 3, 2007

(54) CELL ASSEMBLY

(75) Inventors: Takeshi Miyamoto, Yokohama (JP); Yuji Nakada, Fujisawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 551 days.

(21) Appl. No.: 10/610,770

(22) Filed: Jul. 2, 2003

(65) Prior Publication Data

US 2004/0009334 A1 Jan. 15, 2004

(30) Foreign Application Priority Data

Jul. 9, 2002 (JP) ............................ P2002-200066
Mar. 11, 2003 (JP) ............................ P2003-064950

(51) Int. Cl.
H01M 2/02 (2006.01)
H01M 2/08 (2006.01)
H01M 2/24 (2006.01)

(52) U.S. Cl. .................. 429/149; 429/158; 429/160; 429/162; 361/775; 361/777; 361/803; 174/260

(58) Field of Classification Search ................ None
See application file for complete search history.

(56) References Cited

U.S. PATENT DOCUMENTS

| | | | | |
|---|---|---|---|---|
| 5,445,856 | A * | 8/1995 | Chaloner-Gill | 428/35.9 |
| 5,861,221 | A * | 1/1999 | Ledjeff et al. | 429/32 |
| 6,040,075 | A * | 3/2000 | Adcock et al. | 429/32 |
| 6,380,713 | B2 * | 4/2002 | Namura | 320/112 |
| 6,472,098 | B1 * | 10/2002 | Sawada et al. | 429/163 |
| 7,078,361 | B2 * | 7/2006 | Cisar et al. | 502/101 |
| 2002/0094475 | A1 * | 7/2002 | Aoyama | 429/99 |
| 2003/0091896 | A1 * | 5/2003 | Watanabe et al. | 429/158 |
| 2003/0170535 | A1 * | 9/2003 | Watanabe et al. | 429/158 |
| 2003/0215702 | A1 * | 11/2003 | Tanjou et al. | 429/127 |

FOREIGN PATENT DOCUMENTS

| | | |
|---|---|---|
| JP | 61-189559 U | 11/1986 |
| JP | 04-137583 A | 5/1992 |
| JP | 2000-148297 A | 5/2000 |
| JP | 2000-208118 A | 7/2000 |
| JP | 2000-331660 A | 11/2000 |
| JP | 2001-190030 A | 7/2001 |
| JP | 2001-256937 A | 9/2001 |
| JP | 2002-100337 A | 4/2002 |

(Continued)

Primary Examiner—John B. Vigushin
(74) Attorney, Agent, or Firm—Foley & Lardner LLP

(57) ABSTRACT

A plurality of single cells 10a to 10d, each being packaged by laminate films 12 and 13, are attached onto one surface of a flexible printed circuit board 20, in a state of being interconnected in series to each other, by the use of a double faced tape. Single cells 10a' to 10d' are attached in a similar way onto the other surface of the flexible printed circuit board 20. Each group of the cells on the both surfaces of the flexible printed circuit board 20 are interconnected in parallel. Voltage detection lines 30a to 30e are wired on the flexible printed circuit board 20. Positive and negative electrode tabs 14 and 15 of the respective single cells are connected to the respectively corresponding voltage detection lines 30a to 30e through connection terminals 31a to 31e provided on the flexible printed circuit board 20.

17 Claims, 14 Drawing Sheets

FOREIGN PATENT DOCUMENTS

| | | |
|---|---|---|
| JP | 2002-110258 A | 4/2002 |
| JP | 2002-141052 A | 5/2002 |
| JP | 2002-231320 A | 8/2002 |
| JP | 2002-298805 A | 10/2002 |
| JP | 2003-208886 A | 7/2003 |
| JP | 2003-530658 A | 10/2003 |
| WO | WO 00/41253 A1 | 7/2000 |

* cited by examiner

CELL ASSEMBLY

BACKGROUND OF THE INVENTION

1. Field of the Invention

The present invention relates to a cell assembly in which a plurality of single cells packaged by laminate films are connected in series and/or in parallel.

2. Description of the Related Art

In recent years, electric vehicles which use electricity as the power source and hybrid cars which run by the combination of an engine and a motor have attracted attention under the environment where the air pollution due to exhaust gas from automobiles has been a global problem. In this connection, development of high-power batteries to be mounted on these types of vehicles, which achieve high energy/power densities, has occupied an important position in the industry.

For this type of high-power battery, for example, there is a lithium-ion battery. As the lithium-ion battery, a stacked cell has been known. In the stacked cell, a power generation element includes planar positive and negative electrode plates, which are stacked with one another by interposing separators therebetween. Both surfaces of the power generation element are sandwiched between a pair of laminate films, and peripheral portions of the laminate films are joined to each other by thermowelding, thus sealing an electrolyte together with the power generation element.

With regard to the single cell packaged by the foregoing laminate films, the one in which a cell assembly having the plurality of single cells arranged in parallel is fixed on a metal plate to configure a battery pack is disclosed in, for example, Japanese Patent Laid-Open Publication 2002-100337.

SUMMARY OF THE INVENTION

In the cell assembly made up of the plurality of single cells, the capacities of the cells vary thereamong, and therefore, it is necessary to detect the voltages of the individual single cells to adjust the voltage balances (capacities) among each of these single cells. In this case, wiring for the voltage detection is required besides wiring to be equipped originally for charging/discharging the cells.

When the wiring for the voltage detection is required as described above, the fabrication process of the cell assembly becomes complicated due to increased wiring, thus bringing a cost increase of the product.

In this connection, objects of the present invention are to achieve simplification of voltage detection lines when fabricating a cell assembly by the use of a plurality of single cells and to enhance workability in an assembly process of the cell assembly.

In order to achieve the foregoing objects, a cell assembly according to the present invention includes a single cell packaged by a laminate film having a metal layer and a resin layer, and a circuit board having a voltage detection line for detecting a voltage of the individual cell body, wherein each of the single cell is attached onto the circuit board, and a plurality of the single cells are connected in series and/or in parallel, and an electrode terminal of the individual single cell and the voltage detection line on the circuit board are connected to each other.

DETAILED DESCRIPTION OF THE PREFERRED EMBODIMENT

A first embodiment of the present invention will be described below with reference to the drawings.

Figure 1:
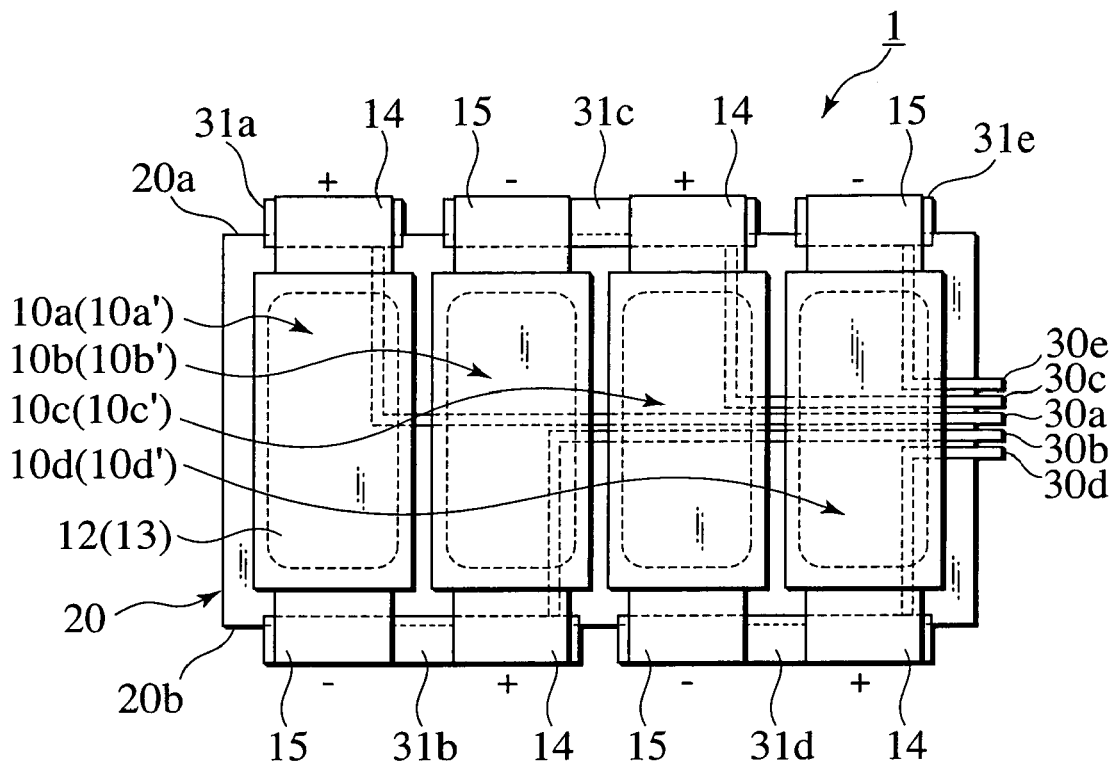
FIG. 1 is a plan view of a cell assembly in a first embodiment of the present invention.
Figure 2:
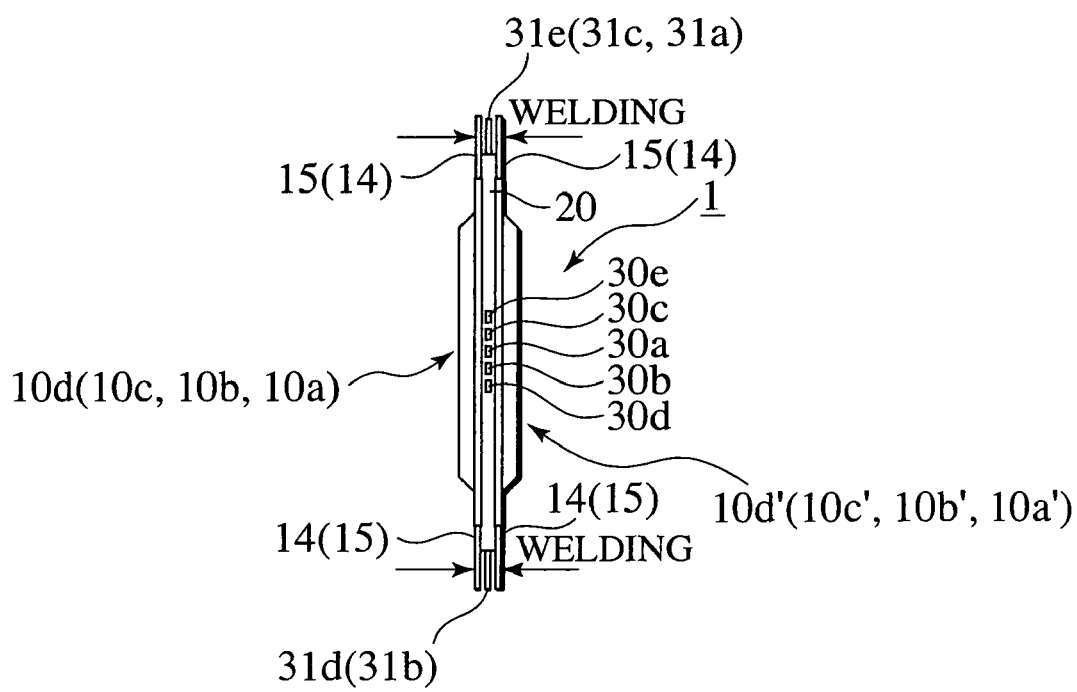
FIG. 2 is a right side view of the cell assembly in the first embodiment of the present invention.

As shown in FIGS. 1 and 2, the cell assembly 1 of the first embodiment is configured by attaching the plurality of single cells 10a to 10d and 10a' to 10d' respectively onto the front and back surfaces the flexible printed circuit board 20 which serves as a circuit board.

Figure 3:
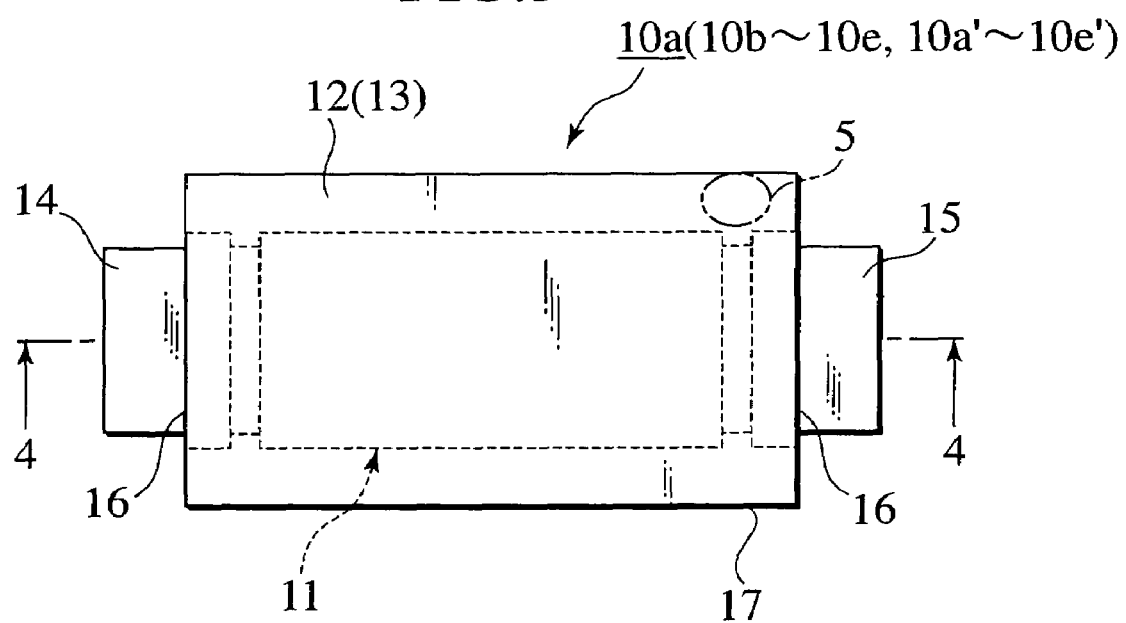
FIG. 3 is a plan view of a single cell in the first embodiment of the present invention.
Figure 4:
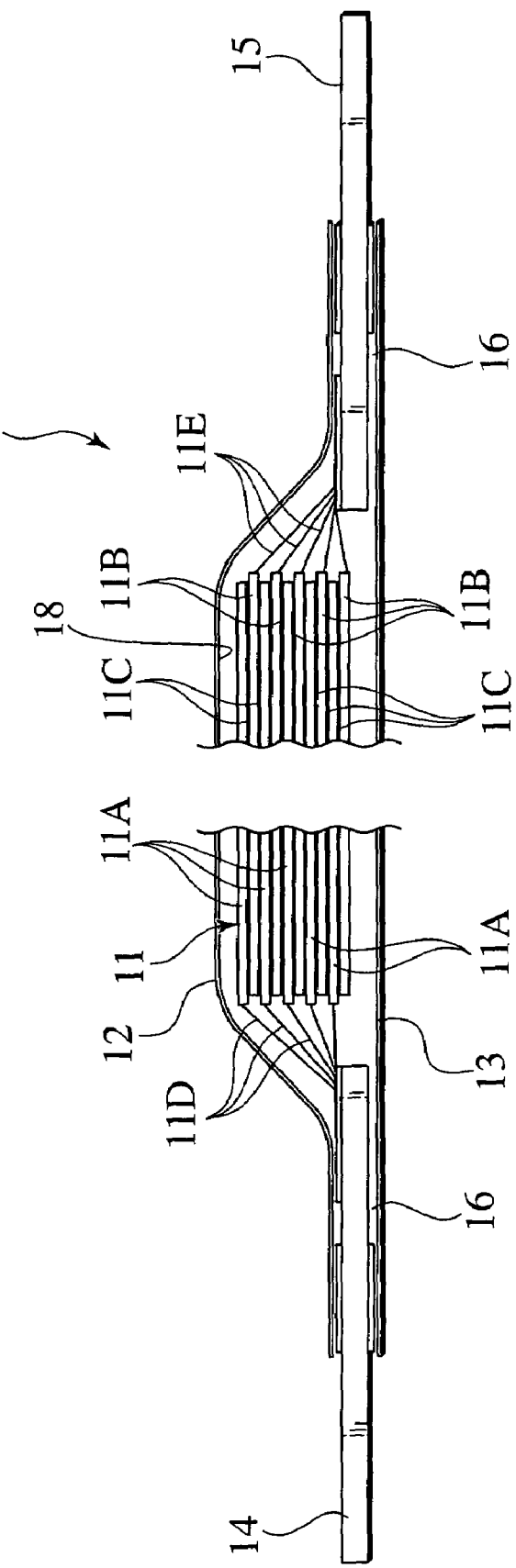
FIG. 4 is an enlarged cross-sectional view taken along a line 4—4 in FIG. 3.

As shown in FIGS. 3 and 4, in each of the single cells 10a to 10d and 10a' to 10d' has the stacked electrode 11 as a power generation element, which is disposed between the center portions of the pair of laminate films 12 and 13. Both surfaces of the stacked electrode 11 (in the front and back directions in FIG. 1) are covered with the pair of laminate films 12 and 13 in a sandwiched manner.

As shown in FIG. 4, the stacked electrode 11 is configured by sequentially stacking the plurality of positive and negative electrode plates 11A and 11B, interposing the separators 11C therebetween. Each of the positive electrode plates 11A is connected to the positive electrode tab 14 through the positive electrode leads 11D, and each of the negative electrode plates 11B is connected to the negative electrode tab 15 through the negative leads 11E. These positive and negative electrode tabs 14 and 15 are drawn outward from the joint portion 16 of the laminate films 12 and 13.

The stacked electrode 11 formed in a stacked structure is made to have a flat rectangular shape with a predetermined thickness. As shown in FIG. 4A, the stacked electrode 11 is housed together with an electrolyte into a concave portion 18 as a housing portion formed in one laminate film 12. Then, the other laminate film 13 formed flat so as to cover the opening portion of the concave portion 18 is disposed, and the peripheral portions of both of the laminate films 12 and 13 are thermally welded to be sealed under low-pressure conditions, thus composing the outer case 17 of these laminate films 12 and 13.

Figure 5:
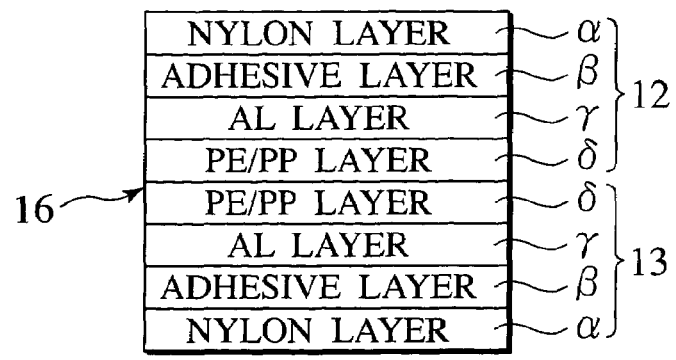
FIG. 5 is an enlarged cross-sectional view of a portion 5 in FIG. 3.

As shown in FIG. 5, each of the laminate films 12 and 13 is composed of a nylon layer $\alpha$ as a resin layer, an adhesive layer $\beta$, an aluminum foil layer $\gamma$ as a metal layer, and a PE (polyethylene) or PP (polypropylene) layer $\delta$ as another resin layer from the outside toward the inside (joint portion 16).

A lithium-ion secondary battery is an example of the single cells 10a to 10d and 10a' to 10d' composed in the manner described above. In this case, as a positive electrode active material which forms the positive electrode plate 11A, each of the single cells contains lithium-nickel composite oxide, and specifically, a compound represented by a general formula $LiNi_{1-x}M_xO_2$ (where $0.01 \leq x \leq 0.5$, and M is at least one of Fe, Co, Mn, Cu, Zn, Al, Sn, B, Ga, Cr, V, Ti, Mg, Ca and Sr).

Moreover, it is also possible for the positive electrode to contain a positive electrode active material other than the lithium-nickel composite oxide. As the other positive electrode active material than the lithium-nickel composite oxide, for example, lithium-manganese composite oxide can be considered, which is a compound represented by a general formula $Li_yMn_{2-z}M'_zO_4$ (where $0.9 \leq y \leq 1.2$, $0.01 \leq z \leq 0.5$, and M' is at least one of Fe, Co, Ni, Cu, Zn, Al, Sn, B, Ga, Cr, V, Ti, Mg, Ca and Sr). Moreover, it is also possible to contain lithium-cobalt composite oxide which is a compound represented by a general formula $LiCo_{1-x}M_xO_2$ (where $0.01 \leq x \leq 0.5$, and M is at least one of Fe, Ni, Mn, Cu, Zn, Al, Sn, B, Ga, Cr, V, Ti, Mg, Ca and Sr).

For example, the lithium-nickel composite oxide, the lithium-manganese composite oxide and the lithium-cobalt composite oxide are obtained by mixing together carbonates such as lithium, nickel, manganese, cobalt in accordance with the compositions, and by firing the resultant mixture in a temperature range from 600° C. to 1000° C. under an atmosphere where oxygen is present. Note that the starting materials are not limited to the carbonates, and it is also possible to synthesize the foregoing oxides from hydroxides, oxides, nitrates, organic salts and the like in a similar way.

Note that it is preferable that the mean particle diameter of the positive electrode active materials such as the lithium-nickel composite oxide and the lithium-manganese composite oxide is 30 μm or less.

In addition, as the negative electrode active material which forms the negative electrode plate 11B, a material of which the specific surface area is within a range from 0.05 $m^2/g$ to 2 $m^2/g$ is used. By setting the specific surface area within the above range, formation of a solid electrolyte interface (SEI) on the surface of the negative electrode can be sufficiently controlled.

When the specific surface area of the negative electrode active material is less than 0.05 $m^2/g$, a region through which the lithium comes and goes is too small, and therefore, lithium doped into the negative electrode active material during charge is not sufficiently undoped therefrom during discharge, thus lowering charge/discharge efficiency. On the other hand, when the specific surface area of the negative electrode active material exceeds 2 $m^2/g$, the formation of the SEI on the surface of the negative electrode cannot be controlled.

For the negative electrode active material, any material can be used as long as it can dope/undope the lithium in a range where a potential applied to the lithium is 2.0V or less. Specifically, usable materials are carbon-based materials including a non-graphitizable carbon material, artificial graphite, natural graphite, pyrolytic graphites, cokes such as pitch coke, needle coke and petroleum coke, graphite, glassy carbons, a fired body of an organic polymer compound, which is carbonized by firing a phenol resin or furan resin at an appropriate temperature, carbon fiber, active carbon, and carbon black.

In addition, metal capable of forming an alloy together with the lithium and the alloy thereof are usable. Specifically, oxides such as iron oxide, ruthenium oxide, molybdenum oxide, tungsten oxide and tin oxide, which dope/undope the lithium at a relatively low potential, nitrides thereof, elements such as Si and Sn as well as 3B group typical elements, or alloys of, for example, Si and Sn represented as $M_xSi$ and $M_xSn$ (where M is one or more metal elements excluding Si or Sn) are usable. Among them, it is particularly preferable to use Si or the Si alloy.

Furthermore, as the electrolyte, a polymer gel electrolyte in which a solution having electrolyte salt dissolved into a non-aqueous solvent is held in a polymer matrix maybe used as well as a liquid electrolyte prepared by dissolving the electrolyte salt into the non-aqueous solvent.

In the case of using the polymer gel electrolyte as a non-aqueous electrolyte, polyvinylidene fluoride, polyacrylonitrile and the like are listed as polymer material to be used.

Any non-aqueous solvents are usable as the non-aqueous solvent as long as they have been conventionally used in this type of non-aqueous electrolyte secondary battery. For example, propylene carbonate, ethylene carbonate, 1,2-dimethoxyethane, diethyl carbonate, dimethyl carbonate, γ-butyrolactone, tetrahydrofuran, 1,3-dioxolane, 4-methyl-1,3-dioxolane, diethyl ether, sulfolane, methyl sulfolane, acetonitrile, propionitrile and the like are listed. Note that one of these non-aqueous solvents may be used alone, or two or more of them may be used after being mixed together.

It is particularly preferable that the non-aqueous solvent contains unsaturated carbonate. Specifically, it is preferable that the non-aqueous solvent contains vinylene carbonate or the like. Among them, it is the most preferable that the non-aqueous solvent contain vinylene carbonate. It is considered that, when the non-aqueous solvent contains the unsaturated carbonate, an effect, which is originated from the property of the SEI (function as a protective film) generated in the negative electrode active material, is obtained, thereby enhancing the resistance of the cell to overdischarge.

In addition, it is preferable that the unsaturated carbonate be contained in the electrolyte in a ratio ranging from 0.05 wt % to 5 wt %. Most preferably, the unsaturated carbonate is contained in a ratio ranging from 0.5 wt % to 3 wt %. By setting the content of the unsaturated carbonate in the range described above, a non-aqueous secondary battery in which an initial discharge capacity and an energy density are high is realized.

The electrolyte salt is not particularly limited as long as it is lithium salt exhibiting ion conductivity. For example, $LiClO_4$, $LiAsF_6$, $LiPF_6$, $LiBF_4$, $LiB(C_6H_5)_4$, LiCl, LiBr, $CH_3SO_3Li$, $CF_3SO_3Li$ and the like are usable. One of these electrolyte salts may be used alone, or two or more of them may be used after being mixed together.

Incidentally, in the cell assembly 1 configured by attaching the plurality of single cells 10a to 10d and 10a' to 10d' onto the flexible printed circuit board 20, the voltage detection lines 30a to 30e are provided to detect the voltages of the individual single cells 10a to 10d and 10a' to 10d' for the purpose of adjusting the voltage balances (capacities) among the individual single cells 10a to 10d and 10a' to 10d'.

In this embodiment, these voltage detection lines 30a to 30e are wired on the flexible printed circuit board 20. Then, in a state where the single cells 10a to 10d and 10a' to 10d' are attached onto the flexible printed circuit board 20, the positive and negative electrode tabs 14 and 15 serving as the electrode terminals of the respective single cells are connected to the respectively corresponding voltage detection lines 30a to 30e.

Figure 6:
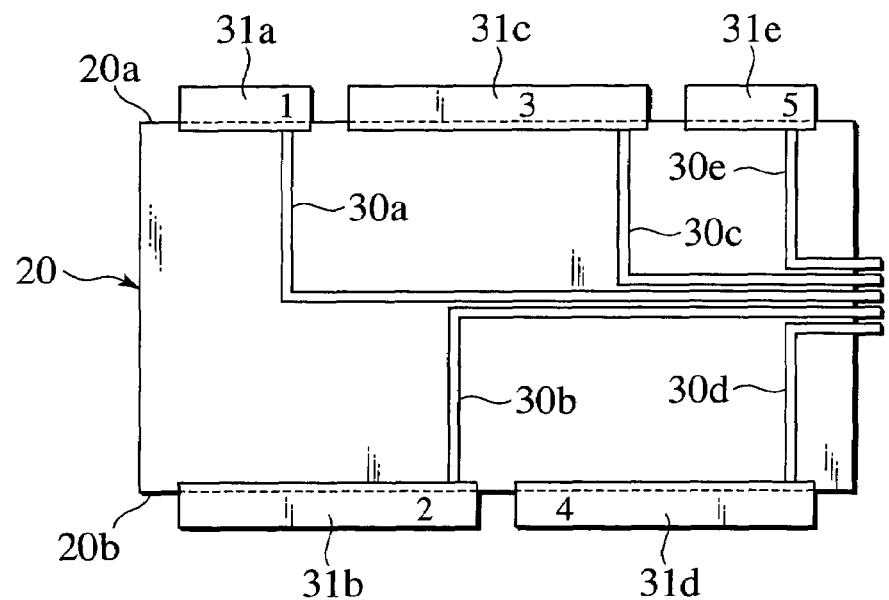
FIG. 6 is a plan view of a circuit board onto which the cell assembly in the first embodiment of the present invention is attached.
Figure 7:
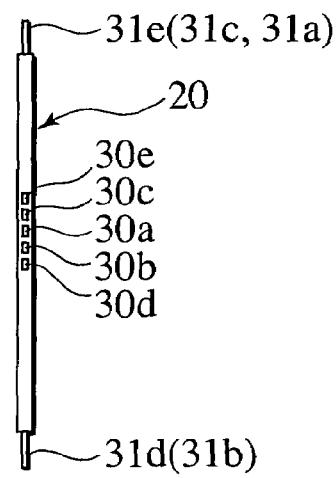
FIG. 7 is a right side view of the circuit board in the first embodiment of the present invention.

As shown in FIGS. 6 and 7, the voltage detection lines 30a to 30e are the first to fifth voltage detection lines 30a to 30e, which are wired in advance on the flexible printed circuit board 20.

Moreover, on the both vertical sides 20a and 20b of the flexible printed circuit board 20 in FIG. 6, the first to fifth connection terminals 31a to 31e for interconnecting the positive and negative electrode tabs 14 and 15 of the single cells 10a to 10d and 10a' to 10d' are provided, and to the first to fifth connection terminals 31a to 31e, the end portions of the first to fifth voltage detection lines 30a to 30e respectively corresponding thereto are connected.

Each of the first and fifth connection terminals 31a and 31e is made into a short type for connecting one single cell thereto. Meanwhile, each of the second, third and fourth connection terminals 31b, 31c and 31d is made into a long type for connecting two single cells provided side by side.

Then, the first, third and fifth connection terminals 31a, 31c and 31e are arranged in this order on one side 20a of the flexible printed circuit board 20 at appropriate intervals. Meanwhile, the second and fourth connection terminals 31b and 31d are arranged in this order on the other side 20b of the flexible printed circuit board 20 at an appropriate interval. To these first to fifth connection terminals 31a to 31e, one ends of the above-described first to fifth voltage detection lines 30a to 30e respectively corresponding thereto are connected. The other ends of the first to fifth voltage detection lines 30a to 30e are drawn outward from the flexible printed circuit board 20.

As shown in FIG. 1, the first to fourth single cells 10a to 10d are attached onto one surface of the flexible printed circuit board 20, and the positive and negative electrode tabs 14 and 15 of the first single cell 10a are connected by welding to the first and second connection terminals 31a and 31b, respectively. The positive and negative electrode tabs 14 and 15 of the second single cell 10b adjacent to the first single cell 10a are connected by welding to the second and third connection terminals 31b and 31c, respectively.

In addition, the positive and negative electrode tabs 14 and 15 of the third single cell 10c adjacent to the second single cell 10b are connected by welding to the third connection terminals 31c and 31d, respectively. The positive and negative electrode tabs 14 and 15 of the fourth single cell 10d adjacent to the third single cell 10c are connected by welding to the fourth and fifth connection terminals 31d and 31e, respectively.

Due to the above, the first to fourth single cells 10a to 10d are connected in series through the first to fifth connection terminals 31a to 31e, and electricity is obtained between the first and fifth connection terminals 31a and 31e.

Incidentally, as shown in FIG. 2, the first to fourth single cells 10a' to 10d' are attached onto the other surface of the flexible printed circuit board 20, which is opposite to one surface where the first to fourth single cells 10a to 10d are attached. The first to fourth single cells 10a to 10d on the one surface and the first to fourth single cells 10a' to 10d' on the opposite surface are arranged to be symmetrical to each other with respect to the flexible printed circuit board 20.

Then, the respectively corresponding positive and negative electrode tabs 14 and 15 of the first to fourth single cells 10a to 10d and 10a' to 10d' which have become symmetrical to each other are connected to the respectively corresponding first to fifth voltage detection lines 30a to 30e by interposing the first to fifth connection terminals 31a to 31e therebetween.

In this case, the first to fifth connection terminals 31a to 31e and the first to fifth voltage detection lines 30a to 30e become common to the first to fourth single cells 10a to 10e and 10a' to 10d' arranged symmetrically on the both surfaces of the flexible printed circuit board 20. Specifically, the positive and negative electrode tabs 14 and 15 of the first to fourth single cells 10a to 10d and 10a' to 10d' arranged symmetrically to each other are connected in common to one of the first to fifth connection terminals 31a to 31e.

Here, the first to fifth voltage detection lines 30a to 30e detect the voltages of the first single cells 10a and 10a' between the first and second voltage detection lines 30a and 30b. The voltages of the second single cells 10b and 10b' are detected between the second and third voltage detection lines 30b and 30c, and the voltages of the third single cells 10c and 10c' are detected between the third and fourth voltage detection lines 30c and 30d. Then the voltages of the fourth single cells 10d and 10d' are detected between the fourth and fifth voltage detection lines 30d and 30e.

Moreover, as shown in FIG. 4, each of the single cells 10a to 10d and 10a' to 10d' is formed into the shape where the concave portion 18 that houses the stacked electrode 11 is formed on the one laminate film 12 which configures the outer case 17, and the portion 18 is protruding outward. Here, the other laminate film 13 is formed flat. When attaching the single cells 10a to 10d and 10a' to 10d' to the flexible printed circuit board 20, this flat laminated film 13 is adhered to the flexible printed circuit board 20 by use of unillustrated adhering means such as a double faced tape and adhesive.

In the cell assembly 1 of the first embodiment, when attaching the first to fourth single cells 10a to 10d and 10a' to 10d' onto the flexible printed circuit board 20, the first to fifth voltage detection lines 30a to 30e for detecting the voltages are wired in advance on the flexible printed circuit board 20. Therefore, with the configuration described above, in the state where the first to fourth single cells 10a to 10d and 10a' to 10d' are attached onto the flexible printed circuit board 20 in the assembly process of the cell assembly 1, these single cells can be easily connected to the respective voltage detection lines 30a to 30e by joining the positive and negative electrode tabs 14 and 15 to the connection terminals 31a to 31e by welding or other means.

Hence, the workability in assembling the cell assembly 1 can be greatly enhanced while achieving the simplification of the wiring of the first to fifth voltage detection lines 30a to 30e, and eventually, efficient mass production can be possible. Therefore, it is possible to achieve a cost reduction of the cell assembly 1 as a product.

In addition, in the case of composing the cell assembly 1 of the single cells 10a to 10d and 10a' to 10d', each being packaged by the flexible thin laminate films 12 and 13, these cells are attached onto the flexible printed circuit board 20 having a certain degree of rigidity. Accordingly, the rigidity of the flexible printed circuit board 20 is added to the cell assembly 1, thus enhancing the rigidity thereof. In such a way, handling of the cell assembly 1 in the manufacturing process will be facilitated.

Furthermore, the cell assembly 1 is configured in a manner that the first to fourth single cells 10a to 10d and 10a' to 10d' are formed into the plate shape to be thinned, before being attached onto the flexible printed circuit board 20. Therefore, a cell assembly 1 with high volume efficiency can be realized. Particularly, in this first embodiment, the volume efficiency can be further enhanced because the first to fourth single cells 10a to 10d and 10a' to 10d' are arranged symmetrically to each other on the both surfaces of the flexible printed circuit board 20.

In addition, in the first to fourth single cells 10a to 10d and 10a' to 10d' which are symmetrical to each other on the both surfaces of the flexible printed circuit board 20, the respectively corresponding positive and negative electrode tabs 14 and 15 are connected to the respectively corresponding first to fifth voltage detection lines 30a to 30e by interposing the first to fifth connection terminals 31a to 31e. Accordingly, the single cells 10 which are symmetrical to each other on the both surfaces of the flexible printed circuit board 20 are connected in parallel, thus making it possible to double the cell capacity of the cell assembly 1.

Moreover, the side of the flat-formed other laminate film 13 of each of the single cells 10a to 10d and 10a' to 10d' is adhered to the flexible printed circuit board 20. Therefore, adhesion stability between the single cells and the flexible printed circuit board is maintained. Meanwhile, the single cells can be connected to the first to fifth connection terminals 31a to 31e without applying the excessive stresses to the positive and negative electrode tabs 14 by largely bending these tabs, which are taken out from the joint portions 16 along the surface direction of the laminate films 13. Consequently, the performance of the cell assembly 1 is stabilized, thus making it possible to enhance reliability thereof.

Furthermore, the connection terminals 31a to 31e which connect the positive and negative electrode tabs 14 and 15 of the single cells 10a to 10d and 10a' to 10d' are provided on the flexible printed circuit board 20, and to these connection terminals 31a to 31e, the respectively corresponding voltage detection lines 30a to 30e are connected. Accordingly, when the single cells 10a to 10d and 10a' to 10d' are connected to the connection terminals 31a to 31e, the voltage detection lines 30a to 30e can be simultaneously connected to the single cells 10a to 10d and 10a' to 10d'. Therefore, the connecting work of the voltage detection lines 30a to 30e can be simplified in the assembly process of the cell assembly 1, and the connection of the voltage detection lines 30a to 30e to the single cells 10a to 10d and 10a' to 10d' can be carried out securely.

Still further, the rigidity of the flexible printed circuit board 20 can be enhanced by providing the connection terminals 31a to 31e, and eventually, the rigidity of the entire cell assembly 1 can be enhanced.

Figure 8:
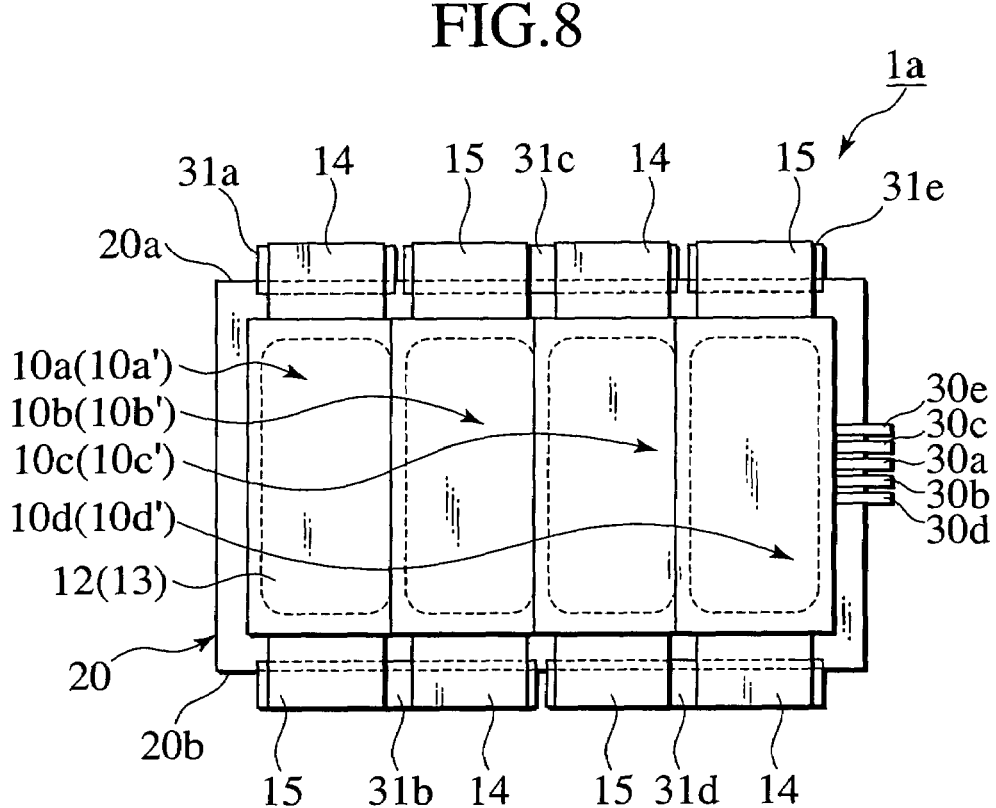
FIG. 8 is a plan view of a cell assembly in a second embodiment of the present invention.
Figure 9:
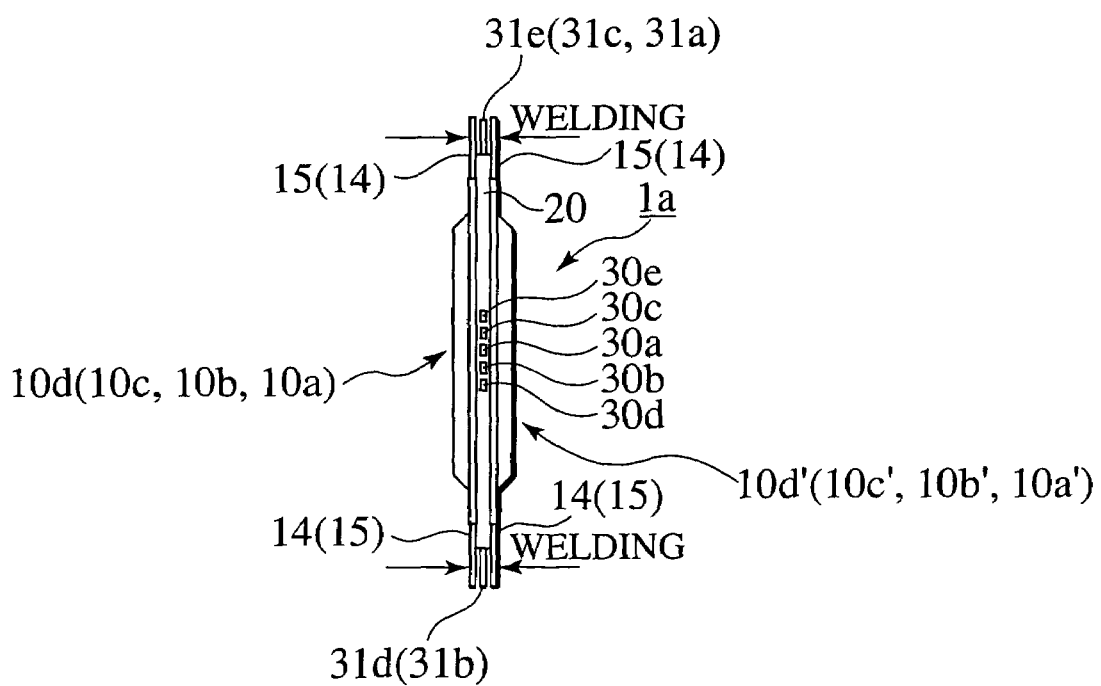
FIG. 9 is a right side view of the cell assembly in the second embodiment of the present invention.

FIGS. 8 and 9 show a second embodiment of the present invention, in which the same reference numerals will be added to the same constituents as those in the previous embodiment, and repeated description will be omitted. FIG. 8 is a plan view of a cell assembly, and FIG. 9 is a right side view of the same.

In the cell assembly 1a of this second embodiment, the single cells 10a to 10d and 10a' to 10d' are attached onto the flexible printed circuit board 20 in a manner that the joint portions 16 of the single cells 10a to 10d and 10a' to 10d' that are adjacent each other are overlapped. The joint portion 16 is formed by thermally welding the peripheral portions of the laminate films 12 and 13 which cover the both surfaces of the power generation element 11 shown in FIG. 3.

Specifically, in the cell assembly 1a of this second embodiment, the first to fourth single cells 10a to 10d and 10a' to 10d' are attached onto the both surfaces of the flexible printed circuit board 20 in a similar way to that for the cell assembly 1 of the first embodiment. In addition, the first to fourth single cells 10a to 10d attached onto the one surface of the flexible printed circuit board 20 are overlapped with one another at the joint portions 16, and the first to fourth single cells 10a' to 10d' attached onto the opposite surface of the flexible printed circuit board 20 are also overlapped with one another at the joint portions 16.

As a matter of course, also in this embodiment, similarly to the first embodiment, the first to fifth voltage detection lines 30a to 30e are wired in advance on the flexible printed circuit board 20. Also the first to fifth connection terminals 31a to 31e are provided, and to which the end portions of the first to fifth voltage detection lines 30a to 30e respectively corresponding to the terminals are connected.

Then, similarly to the first embodiment, the positive and negative electrode tabs 14 and 15 of the first to fourth single cells 10a to 10d and 10a' to 10d' are connected to the first to fifth connection terminals 31a to 31e respectively corresponding thereto.

Hence, in the cell assembly 1a of this second embodiment, the joint portions 16 of the first to fourth single cells 10a to 10d and 10a' to 10d' are overlapped with one another in addition to the functions of the first embodiment. Accordingly, the outer dimension of the cell assembly 1a can be shortened in the array direction of the single cells (right-and-left direction in FIG. 8). Therefore it is possible to enhance the volume efficiency of the single cells 10a to 10d and 10a' to 10d' and to achieve miniaturization of the cell assembly 1a.

Figure 10:
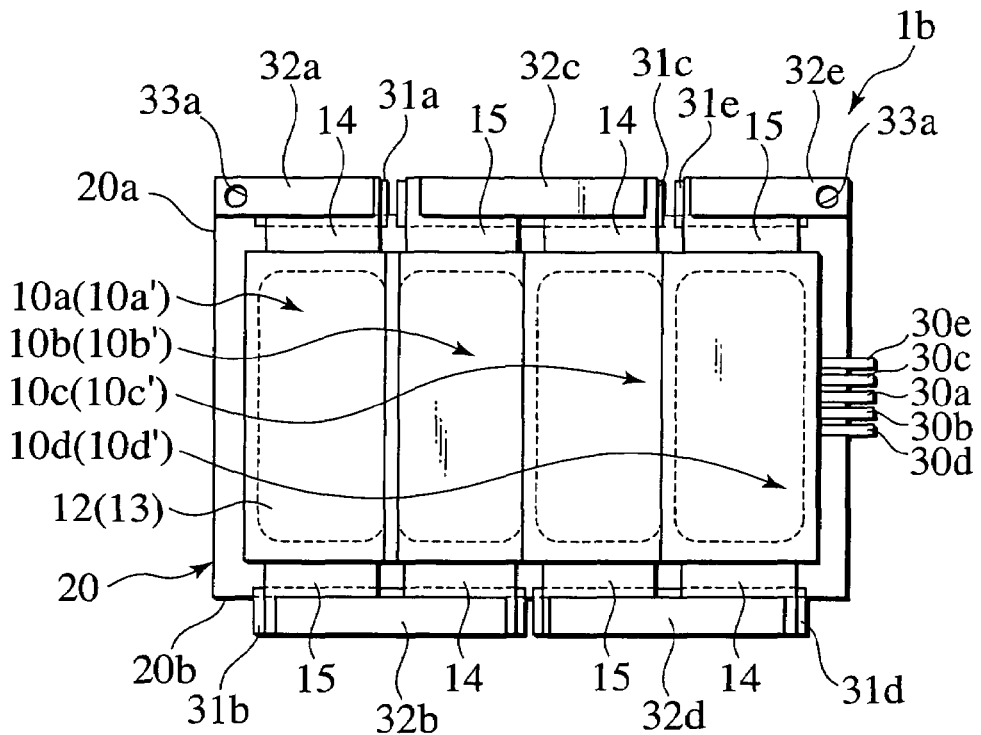
FIG. 10 is a plan view of a cell assembly in a third embodiment of the present invention.
Figure 11:
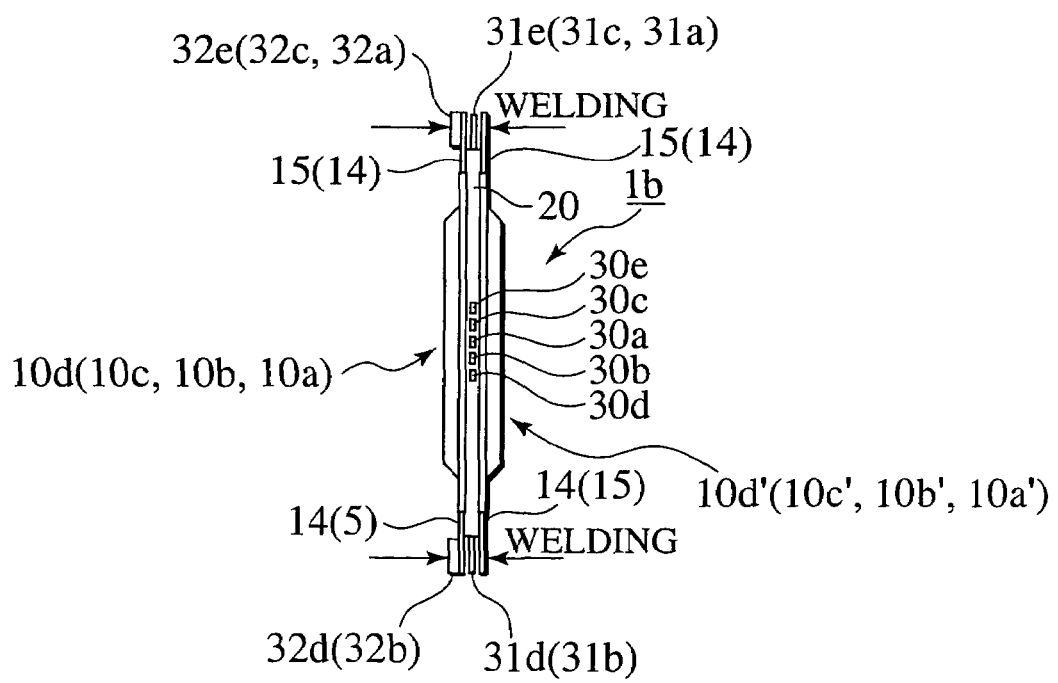
FIG. 11 is a right side view of the cell assembly in the third embodiment of the present invention.

FIGS. 10 and 11 show a third embodiment of the present invention, in which the same reference numerals will be added to the same constituents as those in each of the previous embodiments, and repeated description will be omitted. FIG. 10 is a plan view of a cell assembly, and FIG. 11 is a right side view of the same.

In the cell assembly 1b of this third embodiment, the first to fifth busbars 32a to 32e with a predetermined thickness are coupled onto the one surfaces of the first to fifth connection terminals 31a to 31e in an overlapped manner.

Specifically, similarly to the cell assembly 1a of the second embodiment, in the cell assembly 1b of this third embodiment, the first to fourth single cells 10a to 10d and 10a' to 10d' attached onto the both surfaces of the flexible printed circuit board 20 are arranged to be overlapped with one another at the respective joint portions 16 as shown in FIG. 10. Then, the first to fifth busbars 32a to 32e are coupled to the first to fifth connection terminals 31a to 31e, respectively.

In this case, the busbars 32a to 32e are coupled to the first to fifth connection terminals 31a to 31e so as to sandwich the electrode tabs 14 and 15 connected to the one surfaces of the terminals.

In addition, in this third embodiment, as shown in FIG. 11, the first to fifth busbars 32a to 32e are formed thicker than the first to fifth connection terminals 31a to 31e to make the cross-sectional areas of the bus bars sufficiently large.

In the cell assembly 1b of this third embodiment, the first to fifth busbars 32a to 32e are coupled to the first to fifth connection terminals 31a to 31e. Hence, currents supplied from the first to fourth single cells 10a to 10d will be flown through the total cross sectional area of the first to fifth connection terminals 31a to 31e and first to fifth busbars 32a to 32e. In this third embodiment in particular, the first to fifth busbars 32a to 32e are formed thicker than the first to fifth connection terminals 31a to 31e to obtain the sufficiently large cross-sectional areas. This allows larger currents to be flown through the areas to make it possible to provide a cell assembly 1b which corresponds to higher power.

As for the cell assembly 1b of this third embodiment, disclosed was the case of adding the first to fifth busbars 32a to 32e to the cell assembly 1a of the second embodiment. However, the cell assembly 1b is not limited to this as a matter of course, the similar function can be also attained when the first to fifth busbars 32a to 32e are added to the cell assembly 1 of the first embodiment.

Figure 12:
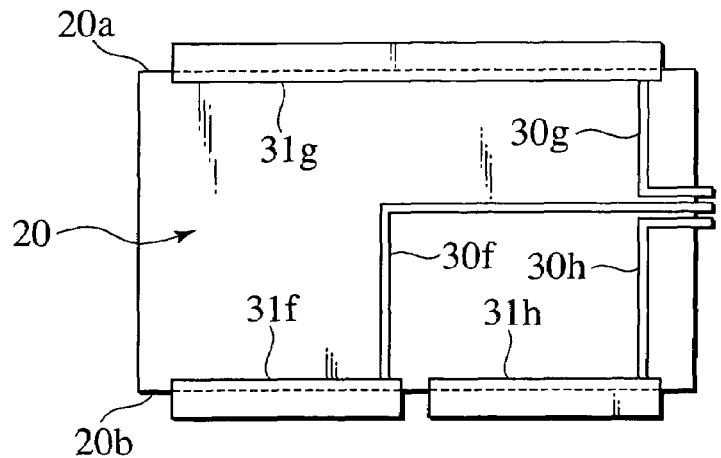
FIG. 12 is a plan view of a circuit board onto which a cell assembly in a fourth embodiment of the present invention is attached.
Figure 13:
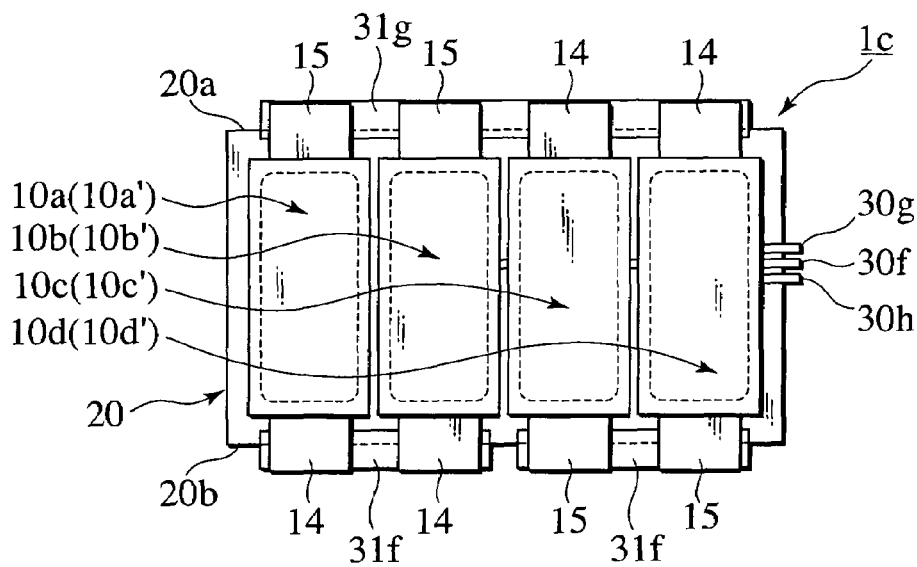
FIG. 13 is a plan view of the cell assembly in the fourth embodiment of the present invention.
Figure 14:
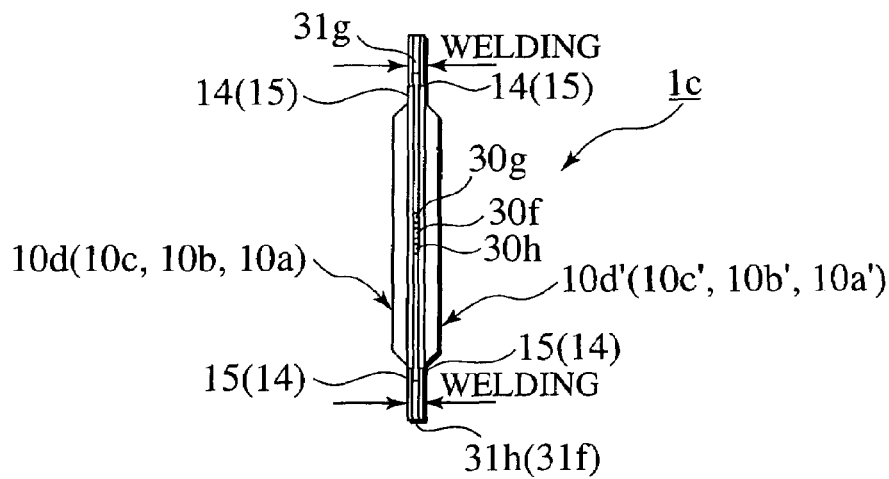
FIG. 14 is a right side view of the cell assembly in the fourth embodiment of the present invention.

FIGS. 12 and 14 show a fourth embodiment of the present invention, in which the same reference numerals will be added to the same constituents as those in the previous embodiments, and repeated description will be omitted. FIG. 12 is a plan view of a circuit board onto which a cell assembly is attached, FIG. 13 is a plan view of the cell assembly, and FIG. 14 is a right side view of the same.

In the cell assembly 1c of this fourth embodiment, the first to fourth single cells 10a to 10d and 10a' to 10d' attached onto the flexible printed circuit board 20 are connected arbitrarily in series and/or in parallel by changing the pattern of the voltage detection lines 30f to 30h wired on the flexible printed circuit board 20.

Specifically, as shown in FIG. 13, the cell assembly 1c of this fourth embodiment includes the first to fourth single cells 10a to 10d and 10a' to 10d' attached onto the both surfaces of the flexible printed circuit board 20 so as to be symmetrical to each other similarly to the first to third embodiments. The first to third connection terminals 31f to 31h are provided for the four single cells attached onto each of the both surfaces of the flexible printed circuit board 20. To these three connection terminals 31f to 31h, the one ends of the voltage detection lines 30f to 30h respectively corresponding thereto are connected. The other ends of the first to third voltage detection lines 30f to 30h are drawn outward from the flexible printed circuit board 20.

As shown in FIG. 12, the first and third connection terminals 31f and 31h are provided on the other side 20b of the flexible printed circuit board 20 at an appropriate interval, and the second connection terminal 31g is provided alone on the one side 20a of the flexible printed circuit board 20.

Then, as shown in FIGS. 13 and 14, the positive electrode tabs 14 of the first and second single cells 10a, 10b and 10a', 10b' are connected by welding to the first connection terminal 31f, and the negative electrode tabs 15 thereof are connected by welding to the second connection terminal 31g. Meanwhile, the positive electrode tabs 14 of the third and fourth single cells 10c, 10d and 10c', 10d' are connected by welding to the second connection terminal 31g, and the negative electrode tabs 15 thereof are connected by welding to the third connection terminal 31h. By this type of connections, electricity will be obtained between the first connection terminal 31f and the third connection terminal 31h.

Hence, in this case, four single cells which are the first and second single cells 10a, 10b and 10a', 10b' are connected in parallel as one group. Also, four single cells which are the third and fourth single cells 10c, 10d and 10c', 10d' are connected in parallel as one group. Then these two groups in which the singles cells are connected in parallel are connected in series.

Note that, in this fourth embodiment, the voltage of the group of the first and second single cells 10a, 10b and 10a', 10b' is detected between the first and second voltage detection lines 30f and 30g. Also, the voltage of the group of the third and fourth single cells 10c, 10d and 10c', 10d' is detected between the second and third voltage detection lines 30g and 30h.

From the above, in the cell assembly 1c of this fourth embodiment, the pattern of the voltage detection lines are changed, for example, the pattern of the voltage detection lines 30f to 30h wired on the flexible printed circuit board 20 are changed from that of the voltage detection lines 30a to 30e of the first to third embodiments This makes it possible to connect the first to fourth single cells 10a to 10d and 10a' to 10d' attached onto the flexible printed circuit board 20 arbitrarily in series and/or in parallel. Thus, the output voltage and capacity of the cell assembly can be adjusted easily.

Figure 15:
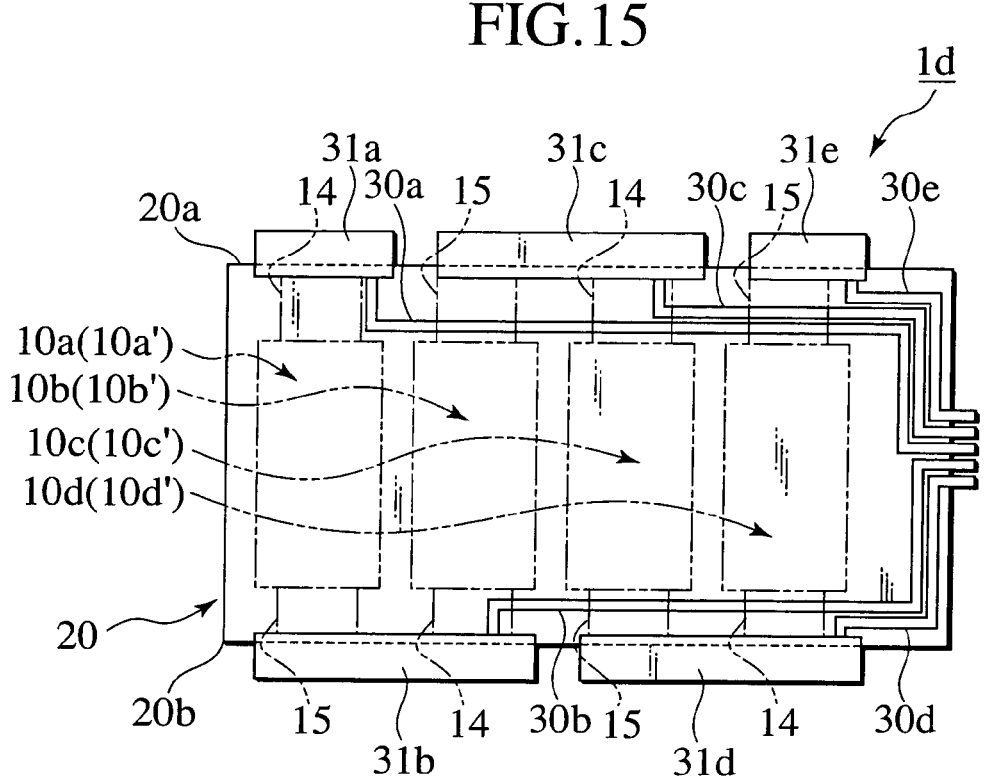
FIG. 15 is a plan view of a circuit board in a fifth embodiment of the present invention.

FIG. 15 shows a fifth embodiment of the present invention, in which the same reference numerals will be added to the same constituents as those in the previous embodiments, and repeated description will be omitted. FIG. 15 is a plan view of a circuit board, in which single cells are shown by chain double-dashed lines.

In the cell assembly 1d of this embodiment, the first to fifth voltage detection lines 30a to 30e on the flexible printed circuit board 20 are wired so as to avoid the first to fourth single cells 10a to 10d and 10a' to 10d' attached onto the flexible printed circuit board 20.

Specifically, in the cell assembly 1d of this fifth embodiment, similarly to the first to third embodiments, the first to fifth voltage detection lines 30a to 30e are wired on the flexible printed circuit board 20, and the first to fifth connection terminals 31a to 31e connected to the first to fifth voltage detection lines 30a to 30e are provided. Then, the positive and negative electrode tabs 14 and 15 of the first to fourth single cells 10a to 10d and 10a' to 10d' attached onto the both surfaces of the flexible printed circuit board 20 are connected to the first to fifth connection terminals 31a to 31e.

Here, the first, third and fifth voltage detection lines 30a, 30c and 30e are biased to the peripheral portion of the one side 20a of the flexible printed circuit board 20 as to be wired, avoiding the center portion of the flexible printed circuit board 20. This center portion of the circuit board corresponds to the portion where the first to fourth single cells 10a to 10d and 10a' to 10d' are attached. Moreover, the second and fourth voltage detection lines 30b and 30d are biased to the peripheral portion of the other end 20b of the flexible printed circuit board 20 to be wired in a similar way.

Hence, in the cell assembly 1d of this fifth embodiment, the first to fourth single cells 10a to 10d and 10a' to 10d' packaged by the flexible laminate films 12 and 13 that serve as the outer case 17 can be prevented from being attached onto the first to fifth voltage detection lines 30a to 30e.

Due to the above, it is possible to prevent the first to fourth single cells 10a to 10d and 10a' to 10d' from having a wavelike deformation due to the portions which are uneven because of the presence of the first to fifth voltage detection lines 30a to 30e. This prevents the degradation of the performance of the cell assembly 1d, due to the excessive stresses applied to each of the stacked electrode 11. It is thus possible to enhance the reliability of the cell assembly 1d. In addition, the first to fifth voltage detection lines 30a to 30e can be prevented from being damaged.

Figure 16:
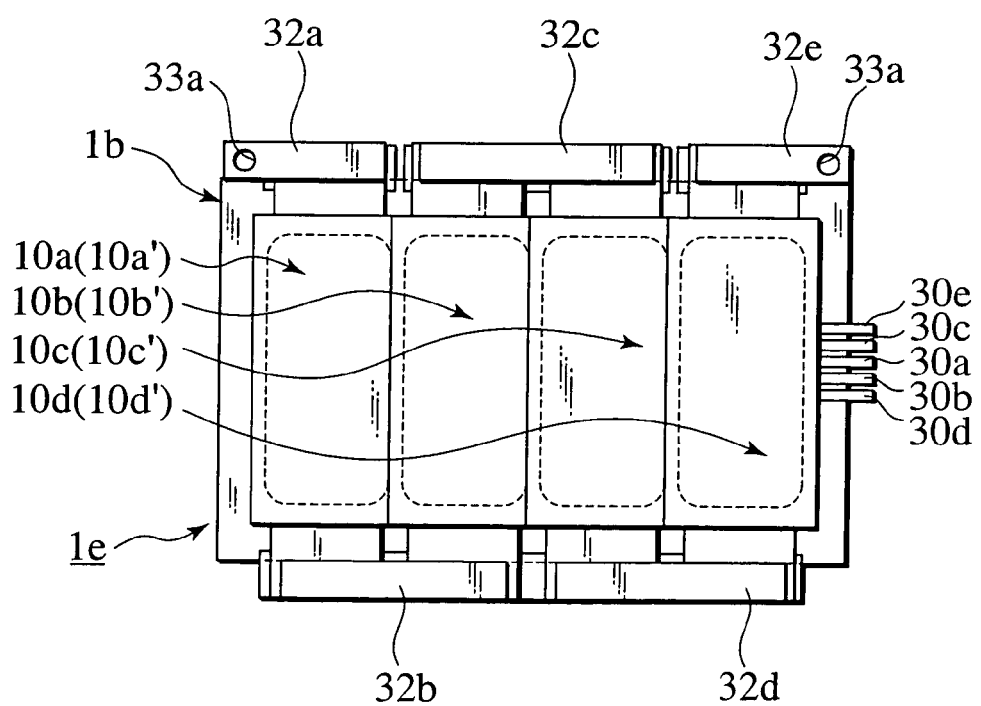
FIG. 16 is a plan view of a cell assembly in a sixth embodiment of the present invention.
Figure 17:
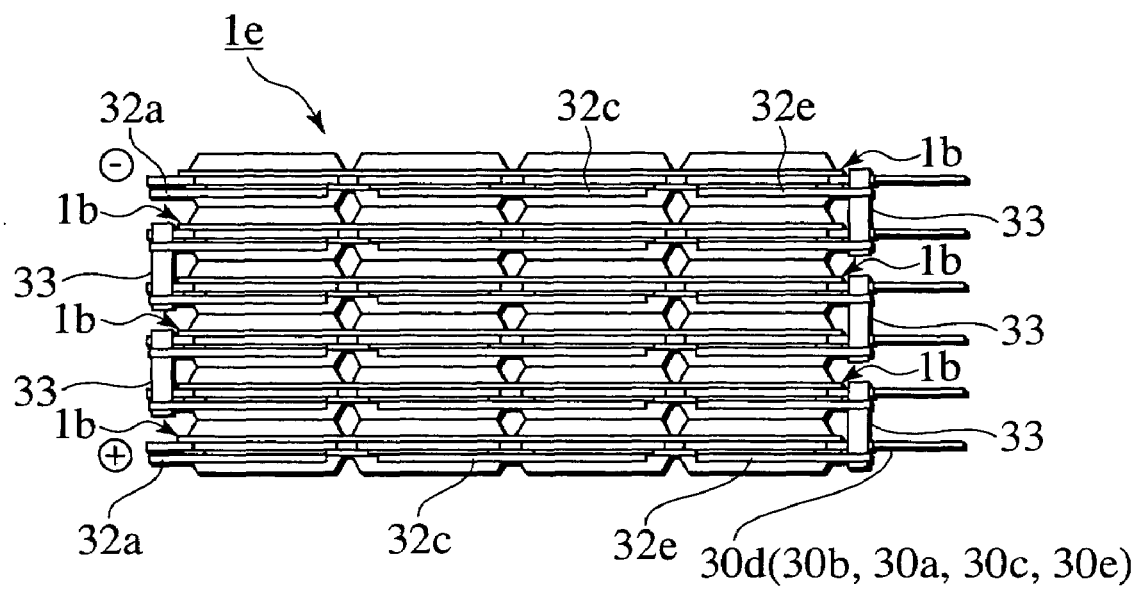
FIG. 17 is a front view showing a stacked state of the cell assemblies in the sixth embodiment of the present invention.
Figure 18:
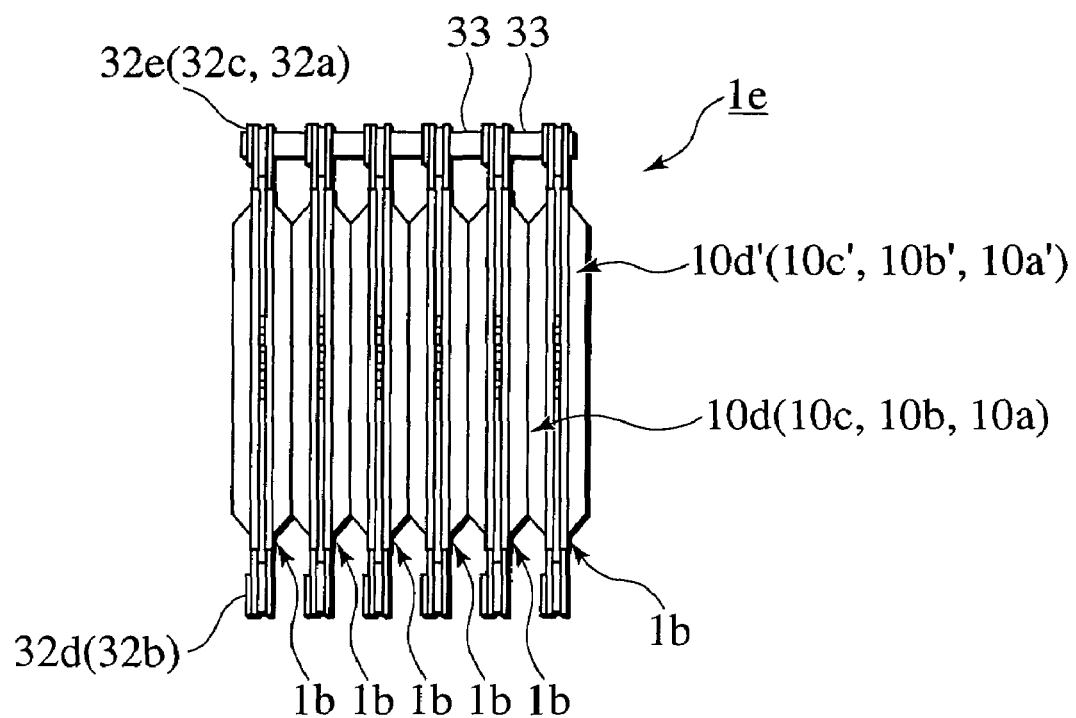
FIG. 18 is a right side view showing the stacked state of the cell assemblies in the sixth embodiment of the present invention.

FIGS. 16 to 18 show a sixth embodiment of the present invention, in which the same reference numerals will be added to the same constituents as those in the previous embodiments, and repeated description will be omitted. FIG. 16 is a plan view of a cell assembly, FIG. 17 is a front view showing a stacked state of the cell assemblies, and FIG. 18 is a right side view showing the stacked state of the cell assemblies.

The cell assembly 1e of this sixth embodiment is configured by stacking the plurality of cell assemblies 1, 1a, 1b, 1c or 1d of the first to fifth embodiments provided on the top of each other. Each of these cell assemblies is configured by attaching the plurality of single cells 10a to 10d and 10a' to 10d' onto the flexible printed circuit board 20.

As shown in FIG. 16, in this sixth embodiment, the cell assembly 1e is composed of the cell assemblies 1b described in the third embodiment with reference to FIGS. 10 and 11, and detailed description of the individual cell assemblies 1b is omitted here.

Specifically, the plural number (six that is an even number in this sixth embodiment) of cell assemblies 1b in the third embodiment are stacked in 6 tiers, in a way that the first to fourth single cells 10a to 10d and 10a' to 10d' attached onto the both surfaces of the flexible printed circuit board 20 as each cell assembly 1b are placed in contact with each other.

Then, with regard to the cell assemblies 1b stacked on one another, the single cells 10a to 10d and 10a' to 10d' of each cell assembly 1b are arranged such that the polarities thereof are reverse to those of the other cell assembly 1b vertically adjacent thereto. In this way, as shown in FIG. 17, the lowermost first busbar 32a is set as a terminal for drawing positive current, and the uppermost first busbar 32a is set as a terminal for drawing negative current.

Note that these terminals for drawing positive and negative currents also serve as terminals for feeding currents during charge, because of the fact that the first to fourth single cells 10a to 10d and 10a' to 10d' configure the secondary battery.

In this case, as shown in FIG. 17, the fifth busbar 32e of the lowermost cell assembly 1b and the fifth busbar 32e of the cell assembly 1b stacked immediately above are connected by a conductive shaft 33. Moreover, the first busbar 32a of the cell assembly 1b just described above and the first busbar 32a of the cell assembly 1b stacked immediately above are connected by the conductive shaft 33. The connection states described above are repeated to the uppermost cell assembly 1b, and thus the cell assemblies 1b stacked in the six stages are connected in tiers to one another.

Note that, in the first and fifth busbars 32a and 32e, the attachment holes 33a for attaching the conductive shafts 33 therethrough are drilled. Therefore, the stacked state of the respective cell assemblies 1b can be maintained by attaching the conductive shafts through the attachment holes 33a. In this case, the single cells 10a to 10d and 10a' to 10d' vertically stacked in contact with each other may be adhered to one another.

Hence, the cell assembly 1e of this sixth embodiment can draw a large current easily while enhancing the volume efficiency by stacking the plurality of cell assemblies 1b and connecting the same aggregations in series to one another.

Naturally, the plurality of stacked cell assemblies 1b may be connected in parallel to one another. In this case, a cell assembly 1e with a large capacity can be provided easily while enhancing the volume efficiency.

Meanwhile, although the case of stacking the cell assemblies 1b of the third embodiment has been disclosed in this sixth embodiment with regard to the cell assembly 1e, the cell assembly 1e is not limited to this. The cell assemblies 1, 1a, 1c or 1d, which were respectively described in the first, second, fourth, and fifth embodiments, or other unillustrated cell assemblies can also be stacked while being connected in series and/or in parallel.

Next, a seventh embodiment of the present invention will be described. In this embodiment, the same reference numerals will be added to the same portions as those in the previous embodiments, and repeated description will be omitted.

Figure 19:
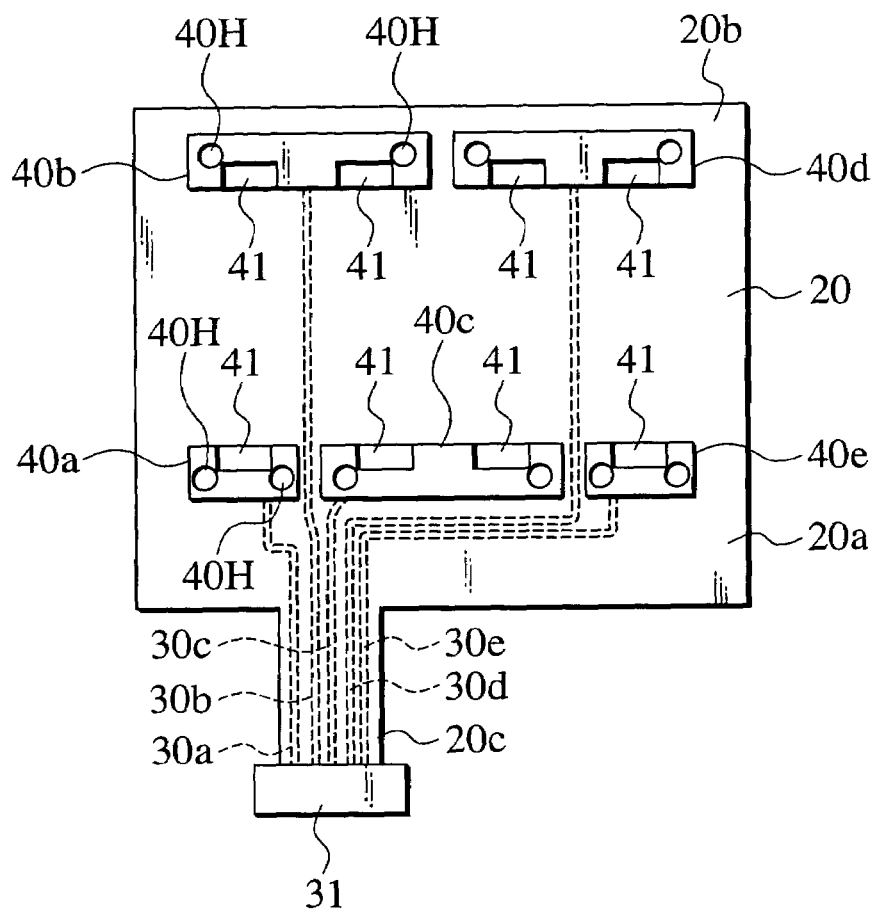
FIG. 19 is a plan view of a circuit board on which a base plate in a seventh embodiment of the present invention is provided.

In this embodiment, as shown in FIG. 19, the first to fifth voltage detection lines 30a to 30e are provided on the flexible printed circuit board 20. On the surface of the flexible printed circuit board 20, the conductive first to fifth base plates 40a to 40e are provided. These base plates are electrically connected to both of the voltage detection lines 30a to 30e and the positive and negative tabs 14 and 15 of the single cells 10a to 10d.

The first and fifth base plates 40a and 40e are a short type for connecting one single cell 10 thereto, whereas the second, third and fourth base plates 40b, 40c and 40d are a long type for connecting two single cells arranged side by side.

Then, while the first, third and fifth base plates 40a, 40c and 40e are arranged in this order on the one side 20a of the flexible printed circuit board 20 at appropriate intervals, the second and fourth base plated 40b and 40d are arranged in this order on the other side 20b of the flexible printed circuit board 20 at an appropriate interval.

To the first to fifth base plates 40a to 40e, the one ends of the respectively corresponding first to fifth voltage detection lines 30a to 30e are connected. The other ends of the first to fifth voltage detection lines 30a to 30e are collectively taken out to the collection portion 20c extended outward from the one side 20a of the flexible printed circuit board 20. Then, the connector 31 of the voltage detection lines 30a to 30e are provided on the tip of the collection portion 20c.

Figure 20:
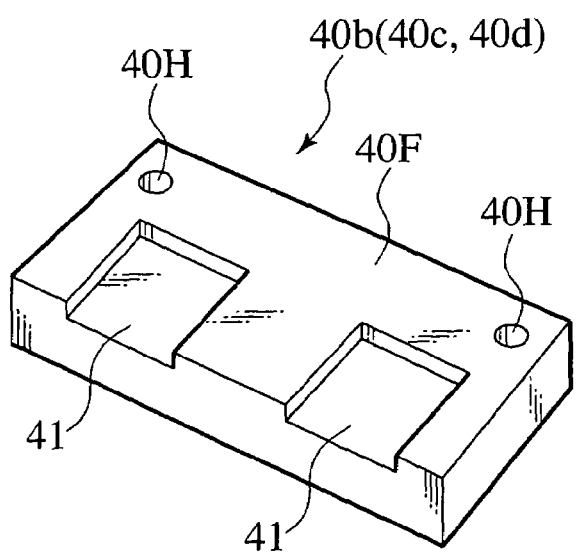
FIG. 20 is an enlarged perspective view of the base plate in the seventh embodiment of the present invention.

As shown in FIG. 20, in each of the base plates 40a to 40e, the concave portions 41, which determine the positions of the positive and negative electrode tabs 14 and 15 of the single cells 10, are provided on the surface 40F serving as an electrode terminal connection portion. Note that, the base plate of FIG. 20 includes two concave portions 41 because one of the second to fourth base plates 40b to 40d, which are the long type, is shown as an example. However, each of the short-type first and fifth base plates 40a and 40e includes one concave portion 41.

Figure 21:
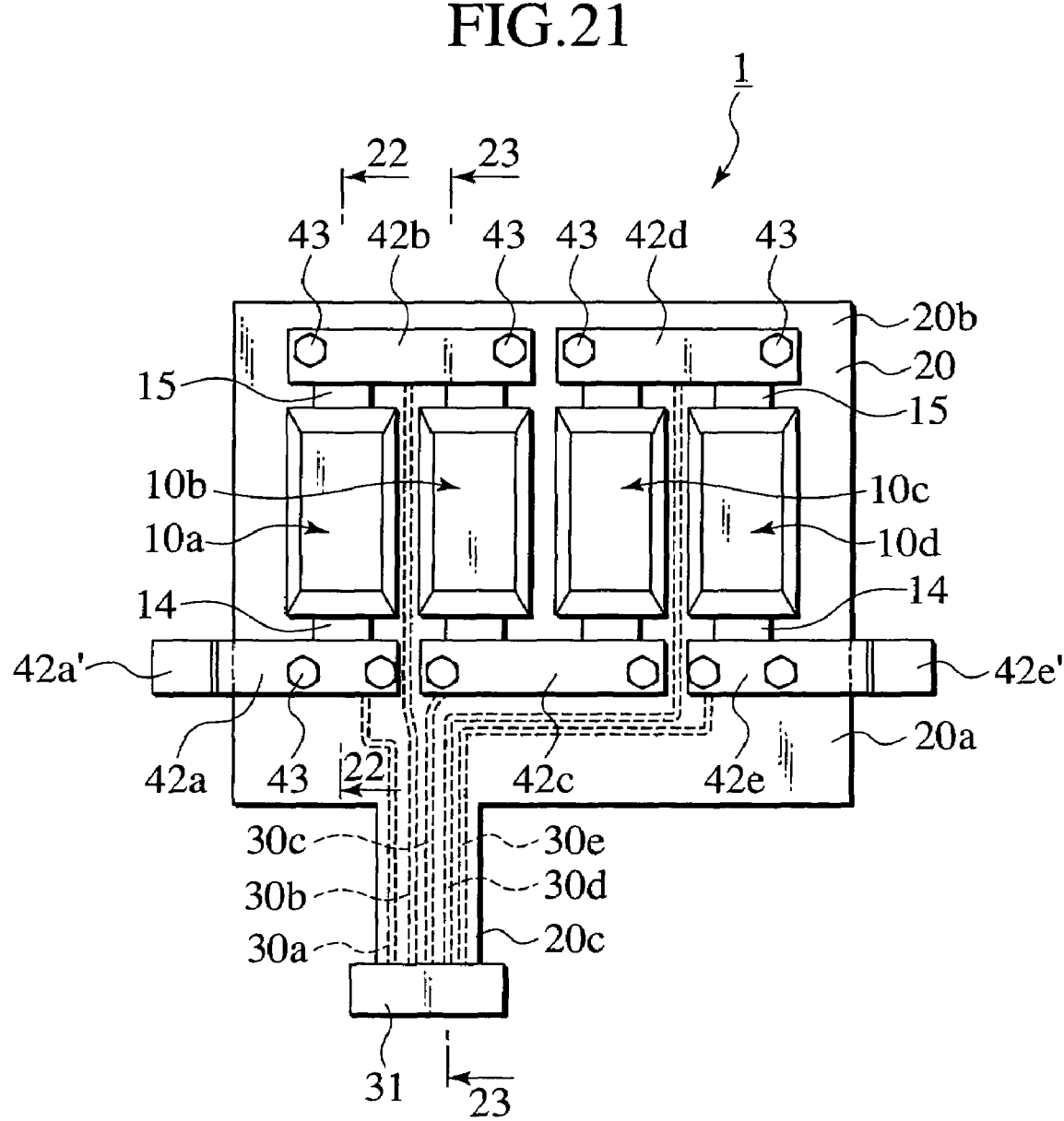
FIG. 21 is a plan view of the circuit board onto which single cells in the seventh embodiment of the present invention are mounted.

Then, as shown in FIG. 21, when mounting the first to fourth single cells 10a to 10d onto the flexible printed circuit board 20, the positive electrode tab 14 of the first single cell 10a is engaged and connected to the concave portion 41 of the first base plate 40a. In addition, the negative electrode tab 15 of the first single cell 10a and the positive electrode 14 of the second single cell 10b engaged and connected to the one and the other concave portions 41 of the second base plate 40b, respectively.

In this way, the negative electrode tab 15 of the second single cell 10b, the positive and negative electrode tabs 14 and 15 of the third single cell 10c and the positive and negative electrode tabs 14 and 15 of the fourth single cell 10d are sequentially connected in an engaged manner to the respective concave portions 41 of the third, fourth and fifth base plates 40c, 40d and 40e. Thus the first to fourth single cells 10a to 10d are connected in series through the first to fifth base plates 40a to 40e.

Figure 22:
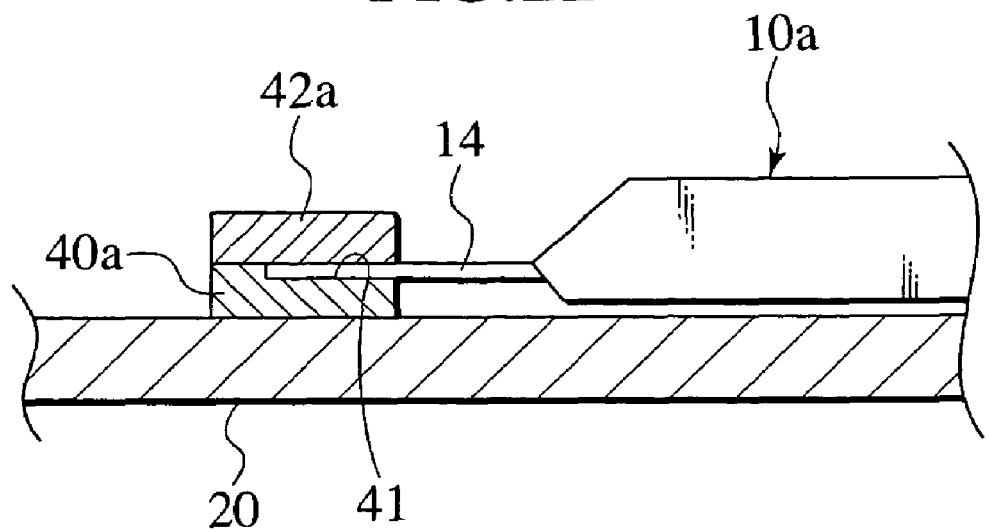
FIG. 22 is an enlarged cross-sectional view of a principal portion, taken along a line 22—22 in FIG. 21.
Figure 23:
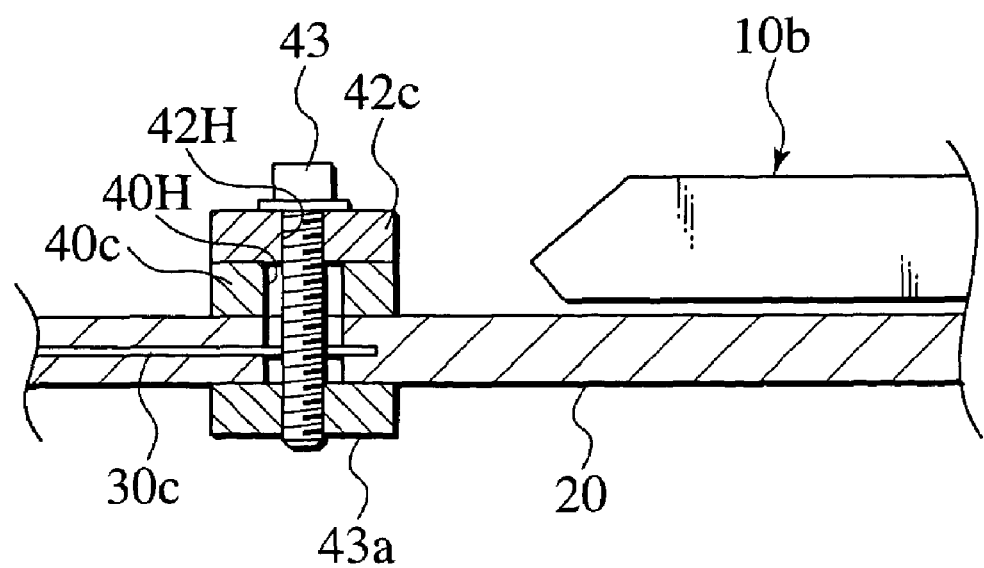
FIG. 23 is an enlarged cross-sectional view of a principal portion, taken along a line 23—23 in FIG. 21.

Moreover, the first to fifth busbars 42a to 42e are provided corresponding to the first to fifth base plates 40a to 40e, respectively. As shown in FIGS. 22 and 23, each of the positive and negative electrode tabs 14 and 15 is fixed by being sandwiched between each of the busbars 42a to 42e and each of the base plates 40a to 40e.

Specifically, in this embodiment, as shown in FIG. 20, the through holes 40H are formed in the both ends of each of the first to fifth base plates 40a to 40e, and the through holes 42H (refer to FIG. 23) which match the through holes 40H are formed on the both ends of each of the first to fifth busbars 42a to 42e. Then, as shown in FIG. 23, each of the attachment bolts 43 is inserted into the through holes 40H and 42H, piercing through the flexible printed circuit board 20. Then the nut 43a is fastened to the lower end of the bolt 43.

In such a way, the positive and negative tabs 14 and 15 are strongly fixed between the base plates 40a to 40e and the busbars 42a to 42e in a sandwiched manner. Simultaneously, the base plates 40a to 40e and the busbars 42a to 42e are coupled to the flexible printed circuit board 20.

In this case, as shown in FIG. 23, the voltage detection lines 30a to 30e are wired inside the flexible printed circuit board 20 in a buried state, and each of the voltage detection lines 30a to 30e corresponding to the base plates 40a to 40e is brought into contact with one of the attachment bolts 43 provided in the both ends of each of the base plates 40a to 40e. Then, the voltage detection lines 30a to 30e will be short-circuited to the respectively corresponding base plates 40a to 40e and the busbars 42a to 42e through the attachment bolts 43.

Figure 24:
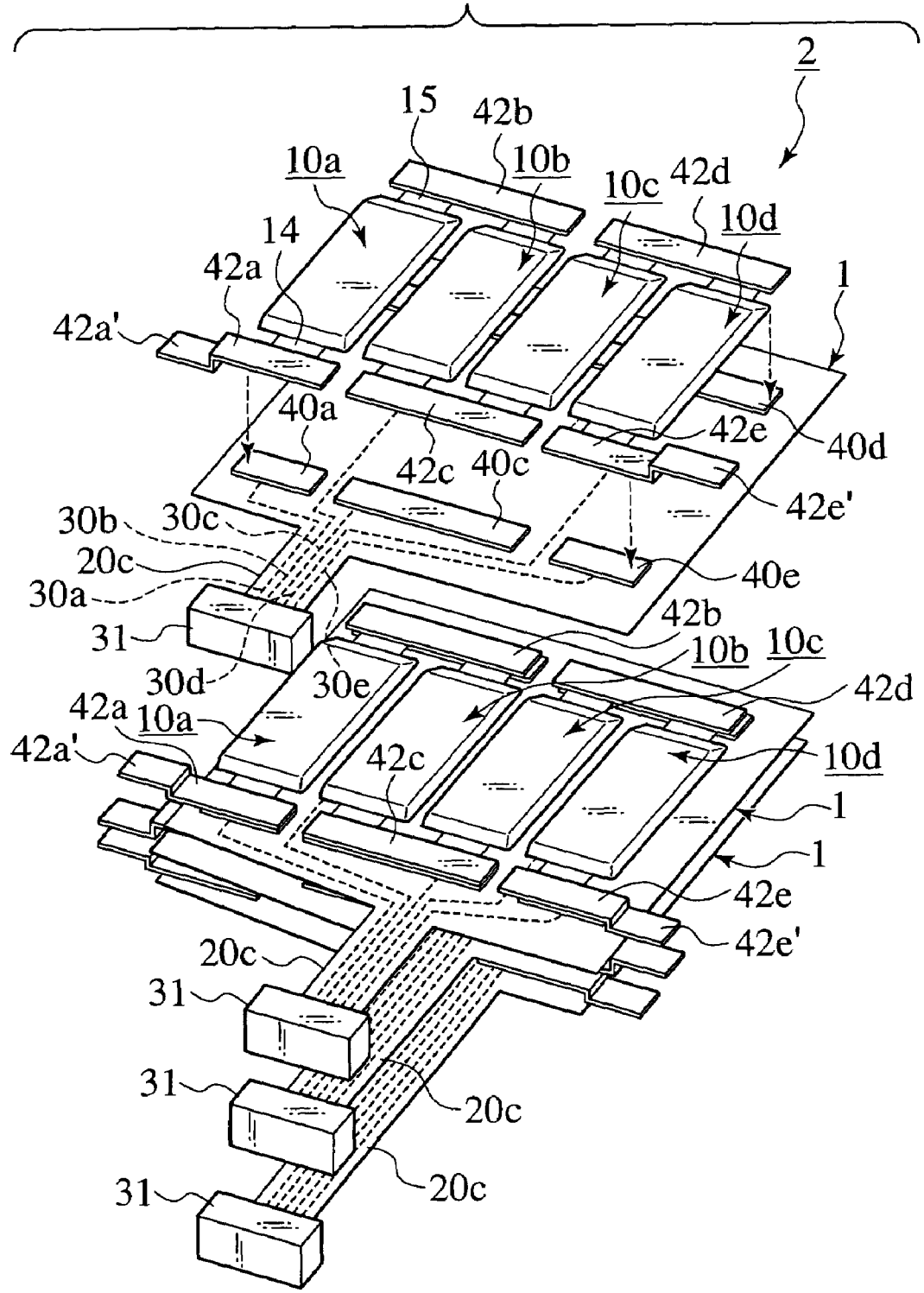
FIG. 24 is an exploded perspective view of a cell assembly in the seventh embodiment of the present invention.

The plurality of single cells 10a to 10d are mounted onto the one-side surface of one flexible printed circuit board 20 in the above-described way to configure the cell assembly 1. Additionally, the plurality of cell assemblies 1 can be stacked as shown in FIGS. 24 and 25 to configure the cell stack 2.

In this case, in the cell stack 2, it is necessary for the cell assemblies 1 stacked in the vertical direction to be electrically interconnected. This interconnection in the vertical direction is implemented in the following manner. As shown in FIGS. 21 and 24, the first and fifth busbars 42a and 42e are extended by being protruded outward of the flexible printed circuit board 20. One side of the extended portions 42a' and 42e' of these busbars are short-circuited to the cell assemblies 1 adjacently provided thereunder, and the other side of the extended portions 42a' and 42e' are short-circuited to a cell assembly 1 adjacently provided thereon. Thus, the plurality of cell assemblies 1 stacked in the vertical direction are interconnected in series.

Hence, it is possible for the cell stack 2 in this embodiment to supply a high-voltage current by series connection of the cell assemblies 1 stacked vertically adjacent to one another, each cell assembly 1 including the plurality of single cells 10a to 10d connected in series.

Figure 25:
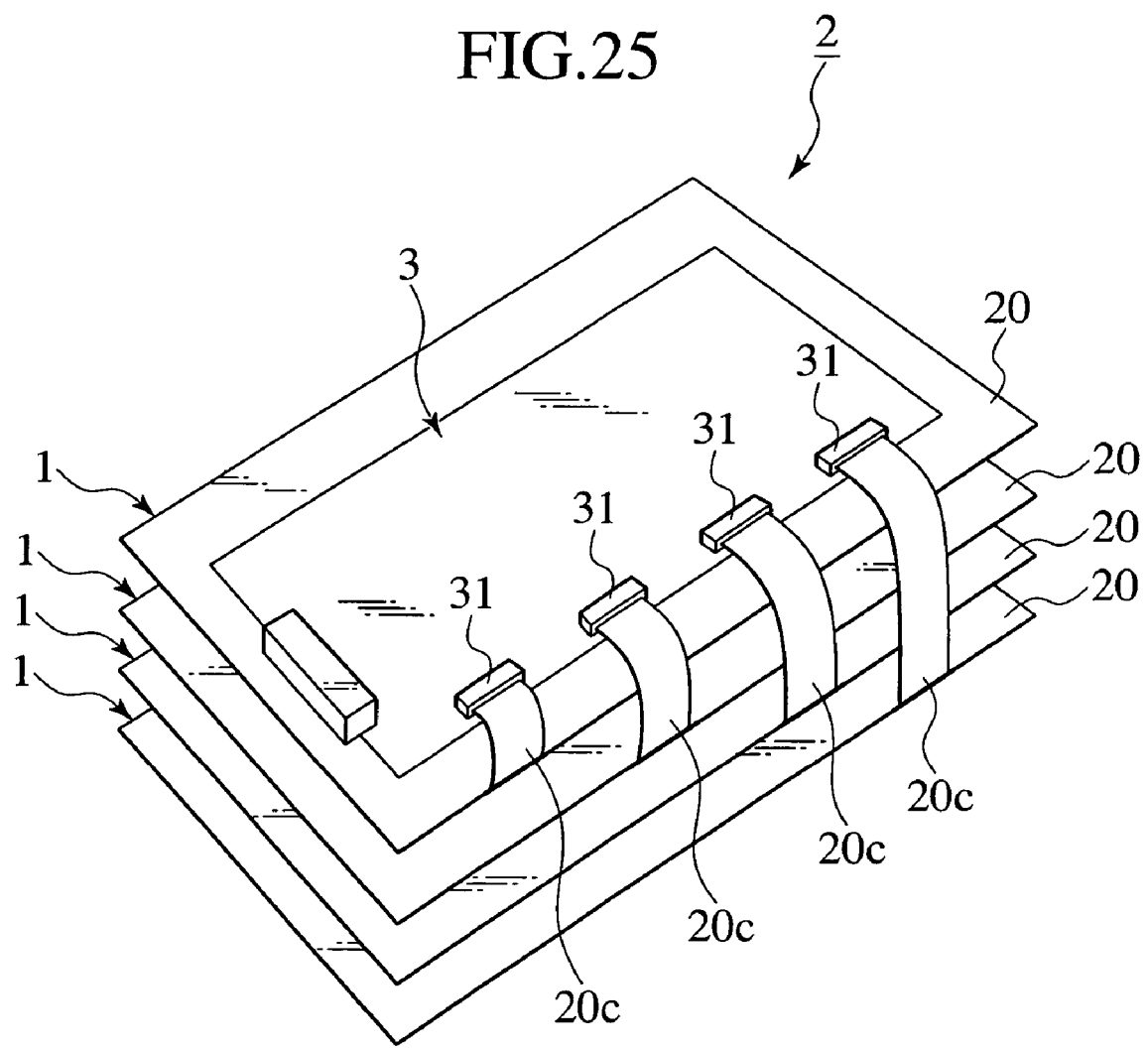
FIG. 25 is an exterior perspective view of the cell assembly in the seventh embodiment of the present invention.

Moreover, as shown in FIG. 25, in the cell stack 2, provided is the cell control board 3 which receives and controls the voltages of the respective single cells 10 taken out by the voltage detection lines 30a to 30e of the cell assemblies 1. This cell control board 3 is disposed in the direction in which the cell control board 3 is overlapped with the flexible printed circuit boards 20. Specifically, the cell control board 3 is disposed on the top surface of the cell stack 2, in other words, on the upper surface of the uppermost cell assembly 1.

Then, the collection portions 20c protruding from the respective flexible printed circuit boards 20 are bent upward as shown in FIG. 25, and the connectors 31 provided on the tips thereof are connected to the cell control board 3. Note that electronic parts such as ICs mounted on the cell control board 3 are omitted.

In this case, the higher the flexible printed circuit boards 20 are arranged in the layers, the shorter the collection portions 20c becomes, because the cell control board 3 is disposed on the top surface of the cell stack 2. Thus, the collection portions 20c are prevented from being unnecessarily loose.

With the hitherto described configuration, in the cell assembly of this embodiment, the conductive base plates 40a to 40e which are to be electrically connected to both of the voltage detection lines 30a to 30e and the positive and negative electrode tabs 14 and 15 of the single cells 10a to 10d are provided on the surface of the flexible printed circuit board 20, when mounting the plurality of single cells 10a to 10d onto the flexible printed circuit board 20. Therefore, in the case of mounting the single cells 10a to 10d, the connections between the single cells 10a to 10d and the voltage detection lines 30a to 30e are completed by connecting the positive and negative electrode tabs 14 and 15 of the respective single cells 10a to 10d to the base plates 40a to 40e. Thus, the simplification of the connections between the single cells 10a to 10d and the voltage detection lines 30a to 30e is achieved, and eventually, the workability in the assembly process can be enhanced.

Moreover, in this embodiment, the concave portions 41 are provided on the surfaces 40F of the base plates 40a to 40e to determine the positions of the positive and negative electrode tabs 14 and 15 of the respective single cells 10a to 10d. Therefore, in addition to the operations and effects described above, the single cells 10a to 10d can be positioned easily and accurately when being mounted onto the flexible printed circuit board 20. Consequently, it is possible to further enhance the workability in the assembly process.

Furthermore, the cell assembly 1 is configured in a manner that the plurality of single cells 10a to 10d are mounted onto one flexible printed circuit board 20 and interconnected in series. Accordingly, a high-voltage current can be taken out by each flexible printed circuit board 20. Then, by stacking the plurality of cell assemblies 1, the cell stack 2 serving as a cell assembly can be configured easily.

Incidentally, though this embodiment discloses the series connection of the plurality of single cells 10a to 10d, these single cells 10a to 10d may be connected in parallel, and can also be connected in series and parallel simultaneously. By parallel connection of the single cells 10a to 10d, the cell capacity of the cell assembly 1 can be increased.

In addition, though the single cells 10a to 10d are mounted onto one surface of the flexible printed circuit board 20, the single cells may be mounted onto the both surfaces of the same without being limited to the above. By mounting the single cells onto the both surfaces in such a way, the volume efficiency of the cell assembly 1 can be enhanced.

Moreover, the busbars 42a to 42e are provided corresponding to the base plates 40a to 40e, and the positive and negative electrode tabs 14 and 15 of the single cells 10a to 10d are fixed between the busbars 42a to 42e and the base plates 40a to 40e. Therefore, the connections of the positive and negative electrode tabs 14 and 15 can be made easily and securely, and the support rigidity of the positive and negative electrode tabs 14 and 15 can be enhanced.

Furthermore, each of the flexible printed circuit boards 20 onto which the single cells 10a to 10d are mounted is made from a flexible material. From the flexible printed circuit board 20, the collection portion 20c is extended, and the voltage detection lines 30a to 30e are collected to the collection portion 20c. Then, on the tip of the collection portion 20c, the connectors 31 of the voltage detection lines 30a to 30e are provided. Consequently, the drawn portions of the voltage detection lines 30a to 30e can be curved and bent in a state of being protected by the collection portion 20c, which makes it easy to guide each of the connectors 31 to its target region to be connected (the cell control board 3 in this embodiment). Thus the workability in wiring is enhanced.

Still further, the connectors 31 are configured to be connected to the cell control board 3 disposed on the flexible printed circuit boards 20 in the direction of overlapping the flexible printed circuit board 20. Therefore, the cell control board 3 can be incorporated in the flexible printed circuit boards 20. Hence, even if the plurality of flexible printed circuit boards 20 are stacked to configure the cell stack 2, the miniaturization thereof can be achieved.

Incidentally, the cell assembly of the present invention has been described by taking those of the first to seventh embodiments as examples. However, various embodiments can be employed without being limited to the above or departing from the gist of the present invention. For example, the number of single cells mounted onto one surface of the flexible printed circuit board may not be four, and the single cells may be attached only onto one surface of the flexible printed circuit board.

In addition, the circuit board is not limited to the flexible printed circuit board, and a more rigid printed circuit board may be used. In this case, the rigidity of the cell assembly can be enhanced more.

Moreover, the single cell is not limited to the lithium-ion secondary battery, and the present invention can also be applied to other batteries configured similarly.

According to the present invention, the single cells can be connected to the voltage detection lines by being attached onto the circuit board in the assembly process of the cell assembly. This is because the voltage detection lines are wired in advance on the circuit board where the single cells are to be attached. Thus, the workability in assembling the cell assembly can be enhanced while achieving the simplification of the wiring of the voltage detection lines. Consequently, it becomes possible to attain the cost reduction of the product.

In addition, the single cells, each being packaged by the flexible laminate films, are attached onto the circuit board when the plurality of the single sells are used to configure the cell assembly. Hence, the rigidity of the cell assembly can be enhanced, and the handling of the cell assembly in the manufacturing process is facilitated.

Japanese Patent Application No. 2002-200066 filed on Jul. 9, 2002 and No. 2003-64950 filed on Mar. 11, 2003 are incorporated by reference herein in its entirety.

What is claimed is:

1. A cell assembly, comprising:
a plurality of single cells, each being packaged by laminate films which respectively include a metal layer and a resin layer, the plurality of single cells having electrode terminals extending beyond the laminate films, wherein joint portions are formed by joining peripheral portions of the laminate films which cover both surfaces of a power generation element of the single cell; and
a circuit board including voltage detection lines for detecting voltages of the individual single cells, wherein the single cells are attached onto the circuit board and connected in series and/or in parallel, and the electrode terminals of the individual single cells are connected to the voltage detection lines on the circuit board, and
wherein each of the joint portions is overlapped with other adjacent joint portions.

2. The cell assembly according to claim 1, wherein, on both surfaces of the circuit board, the single cells are arranged to be approximately symmetrical to each other with respect to the circuit board, and the electrode terminals of each of the symmetrical single cells are connected to the respectively corresponding voltage detection lines.

3. The cell assembly according to claim 1, one surface of the laminate film is formed flat, and the side of the flat-formed laminate film of the single cell is attached onto the circuit board.

4. The cell assembly according to claim 1, wherein each of the joint portions is formed by thermally welding peripheral portions of the laminate films.

5. The cell assembly according to claim 1, wherein the circuit board comprises connection terminals which interconnect the electrode terminals of the individual single cells, and the voltage detection lines are connected to the connection terminals.

6. The cell assembly according to claim 1, further comprising conductive base plates that are provided on the circuit board and that are electrically connected to both of the voltage detection lines and the electrode terminals of the single.

7. The cell assembly according to claim 6, further comprising concave portions that are provided in electrode terminal connection portions of the base plate, wherein the concave portions determine the positions of the electrode terminals.

8. The cell assembly according to claim 6, wherein the single cells are mounted onto any of one surface and both surfaces of the circuit board to be connected in series and/or in parallel.

9. The cell assembly according to claim 6, further comprising busbars that are respectively provided for the base plates, and the electrode terminals are fixed between the busbars and the base plates in a sandwiched manner.

10. The cell assembly according to claim 6, wherein the circuit board is formed of a flexible material, the cell assembly further comprising:
a collection portion which collects drawn portions of the voltage detection lines and which is extended from the circuit board, and
a connector of the voltage detection lines that is provided on a tip of the collection portion.

11. The cell assembly according to claim 10, further comprising a cell control board that is connected to the connector and that is disposed on the circuit board in a direction of overlapping the circuit board.

12. The cell assembly according to claim 1,
wherein the electrode terminals of the individual single cells extend in a same direction and the plurality of single cells are juxtaposed to one another to form a row of single cells extending perpendicularly to the direction of the electrode, and
wherein the voltage detection lines extend beyond a side of the row of single cells.

13. A cell assembly comprising:
a plurality of single cells, each being packaged by laminate films which respectively include a metal layer and a resin layer; and
a circuit board including voltage detection lines for detecting voltages of the individual single cells,
wherein the single cells are attached onto the circuit board and connected in series and/or in parallel, and electrode terminals of the individual single cells are connected to the voltage detection lines on the circuit board,
wherein the circuit board comprises connection terminals which interconnect the electrode terminals of the individual single cells, and the voltage detection lines are connected to the connection terminals, and
wherein the connection terminals interconnect the adjacent single cells, and busbars are coupled onto the connection terminals which interconnect the single cells in an overlapping manner.

14. A cell assembly comprising:
a plurality of single cells, each being packaged by laminate films which respectively include a metal layer and a resin; and
a circuit board including voltage detection lines for detecting voltages of the individual single cells,
wherein the single cells are attached onto the circuit board and connected in series and/or in parallel, and electrode terminals of the individual single cells are connected to the voltage detection lines on the circuit board, and
wherein the plurality of single cells attached onto the circuit board are connected arbitrarily in series and/or in parallel by changing a wiring pattern of the voltage detection lines on the circuit board.

15. A cell assembly comprising:
a plurality of single cells, each being packaged by laminate films which respectively include a metal layer and a resin layer; and
a circuit board including voltage detection lines for detecting voltages of the individual single cells,
wherein the single cells are attached onto the circuit board and connected in series and/or in parallel, and electrode terminals of the individual single cells are connected to the voltage detection lines on the circuit board, and
wherein the voltage detection lines are wired to avoid the single cells attached onto the circuit board.

16. A cell assembly comprising:
a plurality of single cells, each being packaged by laminate films which respectively include a metal layer and a resin; and
a circuit board including voltage detection lines for detecting voltages of the individual single cells,
wherein the single cells are attached onto the circuit board and connected in series and/or in parallel, and electrode terminals of the individual single cells are connected to the voltage detection lines on the circuit board, and
wherein a plurality of the circuit boards where the plurality of single cells are attached are provided, and the plurality of circuit boards, each comprising the plurality of single cells, are stacked on one another.

17. A cell assembly, comprising:
battery means including a plurality of single cells, each being packaged by laminate films which respectively include a metal layer and a resin layer, wherein joint portions are formed by joining peripheral portions of the laminate films which cover both surfaces of a power generation element of the single cell; and
circuit board means including voltage detection lines for detecting voltages of the individual single cells,
wherein the single cells are attached onto the circuit board means and connected in series and/or in parallel, and electrode terminals of the individual single cells are connected to the voltage detection lines on the circuit board means, and
wherein each of the joint portions is overlapped with other adjacent joint portions.

* * * * *